(12) United States Patent
Jeon et al.

(10) Patent No.: US 7,262,721 B2
(45) Date of Patent: Aug. 28, 2007

(54) METHODS OF AND APPARATUSES FOR ADAPTIVE ENTROPY ENCODING AND ADAPTIVE ENTROPY DECODING FOR SCALABLE VIDEO ENCODING

(75) Inventors: Byeung-woo Jeon, Seongnam-si (KR); Woong-il Choi, Namyangju-si (KR)

(73) Assignees: Samsung Electronics Co., Ltd., Gyeonggi-do (KR); Sungkyunk Wan University, Seoul (KR)

( * ) Notice: Subject to any disclaimer, the term of this patent is extended or adjusted under 35 U.S.C. 154(b) by 0 days.

(21) Appl. No.: 11/332,568

(22) Filed: Jan. 17, 2006

(65) Prior Publication Data

US 2006/0158355 A1 Jul. 20, 2006

(30) Foreign Application Priority Data

Jan. 14, 2005 (KR) ........................ 10-2005-0003918
Apr. 15, 2005 (KR) ........................ 10-2005-0031410

(51) Int. Cl.
*H03M 7/00* (2006.01)
(52) U.S. Cl. ........................... 341/107; 341/141
(58) Field of Classification Search ................. 341/107; 717/141; 375/240.12, 240.25
See application file for complete search history.

(56) References Cited

U.S. PATENT DOCUMENTS 5,995,150 A * 11/1999 Hsieh et al. ........... 375/240.12
6,677,868 B2 * 1/2004 Kerofsky et al. ........... 341/107
6,795,584 B2 9/2004 Karczewicz et al.
2004/0151252 A1 * 8/2004 Sekiguchi et al. ..... 375/240.25
2004/0268329 A1 * 12/2004 Prakasam ................... 717/141
2005/0012648 A1 * 1/2005 Marpe et al. ............... 341/107

FOREIGN PATENT DOCUMENTS

JP 2003-319391 A 11/2003
WO WO 03/083856 A1 10/2003

OTHER PUBLICATIONS

Wen-Hsiao Peng; Tihao Chiang; Hsueh-Ming Hang "Context-based binary arithmetic coding for fine granuality scalability" In: IEEE Signal Processing and Its Applications. 2003. Proceedings. Seventh International Symposium on vol. 1, Jul. 1-4, 2003 p. 105-108.

* cited by examiner

*Primary Examiner*—Jean Bruner Jeanglaude
(74) *Attorney, Agent, or Firm*—Sughrue Mion, PLLC

(57) ABSTRACT

Methods and apparatuses are provided for adaptive entropy encoding and adaptive entropy decoding using various context models. A scalable entropy encoding method includes determining a context by referring to both syntax elements in the same layer as a block including a syntax element to be encoded and syntax elements in lower layers or only the syntax elements in the lower layers and performing entropy encoding on the syntax element using the determined context.

45 Claims, 21 Drawing Sheets

METHODS OF AND APPARATUSES FOR ADAPTIVE ENTROPY ENCODING AND ADAPTIVE ENTROPY DECODING FOR SCALABLE VIDEO ENCODING

CROSS-REFERENCE TO RELATED PATENT APPLICATION

This application claims priority from Korean Patent Application No. 10-2005-0003918, filed on Jan. 14, 2005 and Korean Patent Application No. 10-2005-0031410, filled on Apr. 15, 2005, in the Korean Intellectual Property Office, the disclosures of which are incorporated herein in their entirety by reference.

BACKGROUND OF THE INVENTION

1. Field of the Invention

Methods and apparatuses consistent with the present invention relate to adaptive entropy encoding and adaptive entropy decoding for scalable video encoding, and more particularly, to adaptive entropy encoding and adaptive entropy decoding using various context models.

2. Description of the Related Art

Scalable video encoding is video encoding for transmitting transmission data after adjusting the amount of transmission data according to heterogeneous network and terminal environments and is essential for processing videos adaptively according to various transmission environments. With advances in mobile communication technologies, transmission systems, high-performance semiconductors, and video compression technologies, the demand for video services that can adapt to various transmission environments is growing fast.

However, to process videos adaptively according to changes in various environments including a channel bandwidth, a terminal processing capability, a packet loss rate, and a user's mobile environment, conventional video encoding techniques that have been developed based on specific communication environments are not suitable for encoding videos adaptively according to various transmission environments. Scalable video encoding is an intelligent technique of adapting to such various transmission environments. Examples of scalable video encoding include spatial scalable encoding, frame-rate adaptive temporal scalable encoding, and signal-to-noise ratio (SNR) scalable encoding based on video quality.

Conventional video standards include these scalable video encoding techniques. For example, there are MPEG-2 scalable encoding based on video data transmission mainly in asynchronous transfer mode (ATM) networks, SNR, temporal, and spatial scalable encoding of H.263 Annex.0, and MPEG-4 based fine granular scalable encoding. In addition, MPEG-4 AVC compliant scalable video encoding is being standardized. MPEG-4 AVC compliant scalable video encoding aims at providing scalable video encoding in terms of SNR, temporal, and spatial scalabilities.

FIG. 1 is a view for explaining an example of video encoding using scalable video encoding.

Referring to FIG. 1, it can be seen that scalable video encoding can be performed in terms of SNR, temporal, and spatial scalabilities. Scalable video encoding involves encoding a video into multiple layers according to a network state, in which enhancement layers are encoded using data of their immediately lower layers.

In the example of video encoding shown in FIG. 1, when a transmission bit rate of video data is below 41 kbps, only a base layer 110 is encoded. When a transmission bit rate of video data is between 41 kbps and 80 kbps, SNR scalable encoding that improves video quality using data of the base layer 110 is performed to create and encode a first enhancement layer 120. A picture size of each frame of the base layer 110 and the first enhancement layer 120 is in a quarter common intermediate format (QCIF), and the base layer 110 and the first enhancement layer 120 are encoded at a rate of 15 frames per second.

The picture size of each frame of a second enhancement layer 130 and a third enhancement layer 140 is specified by a CIF, and the second enhancement layer 130 and the third enhancement layer 140 are encoded at a rate of 30 frames per second. Thus, when a transmission bit rate of video data is 115 kbps or more, the second enhancement layer 130 is created by up-sampling frames having the QCIF picture size in the first enhancement layer 120 into frames having the CIF picture size and performing predictive encoding on the upsampled frames to further create intermediate frames, i.e., high-pass (H) frames. When a transmission bit rate of video data is 256 kbps or more, the third enhancement layer 140 is created by performing SNR scalable encoding that improves video quality using data of the second enhancement layer 130, which is immediately below the third enhancement layer 140.

Since bi-predictive (B) frames or H frames of each layer are used as reference frames for motion compensation of preceding frames in terms of a transmission order, they can be temporal scalable encoded. Referring to FIG. 1, I frames and P frames or low-pass (L) frames precede B frames or H frames in terms of a transmission order. A transmission order between the B frames and H frames changes with indices (indicated by superscripts in frame names) assigned to the B frames and H frames, as shown in FIG. 1. A frame is preferentially transmitted as its index is low among the B frames and as its index is high among H frames.

For example, in the base layer 110 or the first upper layer 120, $B^1$ frames are motion-compensated by referring to I frames and P frames and $B^2$ frames are motion-compensated by referring to the $B^1$ frames. In the second enhancement layer 130 and the third enhancement layer 140, $H^3$ frames are motion-compensated by referring to $L^3$ frames and $H^2$ frames are motion-compensated by referring to the $H^3$ frames. Thus, a frame transmission order is I->P->$B^1$->$B^2$->$B^3$ in the base layer 110 and the first enhancement layer 120 and is $L^3$->$H^3$->$H^2$->$H^1$->$H^0$ in the second enhancement layer 130 and the third enhancement layer 140. A transmission order between frames having the same index is determined by a time order of the frames. Through such temporal scalable encoding, spatial scalable encoding, and SNR scalable encoding, a decoder can decode layers at scalable bit rates corresponding to the layers.

Although scalable video encoding has already been established as a standard in the MPEG-2 standard and has been studied in depth, it has not yet come into common use. The main reason for this is a low coding efficiency. In other words, when compared to a non-scalable video encoder, a scalable video encoder performs encoding to gradually improve the quality of a low-quality base layer. As a result, even when videos have the same bit rate, the qualities of some of the videos may be seriously degraded. Without addressing such a coding efficiency problem, scalable encoding is difficult to deploy in the market.

To solve the problem, research is being actively conducted on overcoming encoding efficiency degradation in scalable encoding. For example, in spatial scalable encoding, encoding efficiency can be greatly improved compared to independent encoding of each layer, by using up-sampled frames of a lower layer in motion compensation. In other words, since there is a high correlation between layers, a high encoding efficiency can be obtained in predictive encoding by using such a high correlation.

However, in conventional scalable video encoding, entropy encoding does not use a correlation between layers, but instead is performed in the same manner as non-scalable video encoding. As a result, encoding efficiency degradation cannot be solved.

SUMMARY OF THE INVENTION

The present invention provides a method of and an apparatus for context-based adaptive entropy encoding using a correlation between syntax elements of layers to improve the efficiency of entropy encoding in a scalable video encoder which encodes a video into multiple layers.

The present invention also provides a method of and an apparatus for context-based adaptive entropy decoding using a correlation between syntax elements of layers.

According to an aspect of the present invention, there is provided a scalable entropy encoding method. The scalable entropy encoding includes determining a context by referring to both syntax elements in the same layer as a block including a syntax element to be encoded and syntax elements in lower layers or only the syntax elements in the lower layers and performing entropy encoding on the syntax element using the determined context.

According to another aspect of the present invention, there is provided an entropy encoding method. The entropy encoding method includes transforming a syntax element to be encoded into a binary string by referring to one of syntax elements in the same layer as a block including the syntax element to be encoded, syntax elements in lower layers, and both the syntax elements in the same layer and the syntax elements in the lower layers, determining a context by referring to the syntax elements in the same layer, and performing entropy encoding on the syntax element to be encoded using the determined context.

According to still another aspect of the present invention, there is provided a scalable entropy decoding method. The scalable entropy decoding method includes receiving entropy-encoded data and determining a context by referring to syntax elements in the same layer as a block including an entropy-encoded syntax element and syntax elements in lower layers or only the syntax elements in the lower layers and performing entropy decoding on the entropy-encoded data using the determined context.

According to yet another aspect of the present invention, there is provided an entropy decoding method. The entropy decoding method includes receiving entropy-encoded data and determining a context by referring to syntax elements in the same layer as a block including an entropy-encoded syntax element, performing entropy encoding on the entropy-encoded data using the determined context, and transforming an entropy-decoded binary string into a symbol by referring to one of syntax elements in the same layer as a block including the entropy-encoded syntax element, syntax elements in lower layers, and both the syntax elements in the same layer and the syntax elements in the lower layers.

According to yet another aspect of the present invention, there is provided a scalable entropy encoder including a context determining unit and an entropy encoding engine. The context determining unit determines a context by referring to both syntax elements in the same layer as a block including a syntax element to be encoded and syntax elements in lower layers or only the syntax elements in the lower layers. The entropy encoding engine performs entropy encoding on the syntax element using the determined context.

According to yet another aspect of the present invention, there is provided an entropy encoder including a binary string transforming unit, a context determining unit, and an entropy encoding engine. The binary string transforming unit transforms a syntax element to be encoded into a binary string by referring to one of syntax elements in the same layer as a block including the syntax element to be encoded, syntax elements in lower layers, and both the syntax elements in the same layer and the syntax elements in the lower layers. The context determining unit determines a context by referring to the syntax elements in the same layer. The entropy encoding engine performs entropy encoding on the syntax element to be encoded using the determined context.

According to yet another aspect of the present invention, there is provided a scalable entropy decoder including a context determining unit and an entropy decoding engine. The context determining unit receives entropy-encoded data and determines a context by referring to syntax elements in the same layer as a block including an entropy-encoded syntax element and syntax elements in lower layers or only the syntax elements in the lower layers. The entropy decoding engine performs entropy decoding on the entropy-encoded data using the determined context.

According to yet another aspect of the present invention, there is provided an entropy decoder including a context determining unit, an entropy decoding engine, and a symbol transforming unit. The context determining unit receives entropy-encoded data and determines a context by referring to syntax elements in the same layer as a block including an entropy-encoded syntax element. The entropy decoding engine performs entropy encoding on the entropy-encoded data using the determined context. The symbol transforming unit transforms an entropy-decoded binary string into a symbol by referring to one of syntax elements in the same layer as a block including the entropy-encoded syntax element, syntax elements in lower layers, and both the syntax elements in the same layer and the syntax elements in the lower layers.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE INVENTION

Entropy encoding and decoding will be described, including context-based entropy encoding and decoding using a correlation between encoding elements of layers according to exemplary embodiments of the present invention. More specifically, context-based adaptive binary arithmetic coding (CABAC) employed in H.264/MPEG-4 AVC due to its high coding efficiency will be described in detail, along with other entropy encoding methods such as adaptive arithmetic coding, Huffman coding, and universal variable length coding (UVLC). The present invention is not limited to CABAC, but can be applied to a general entropy encoding and decoding method.

Figure 1:
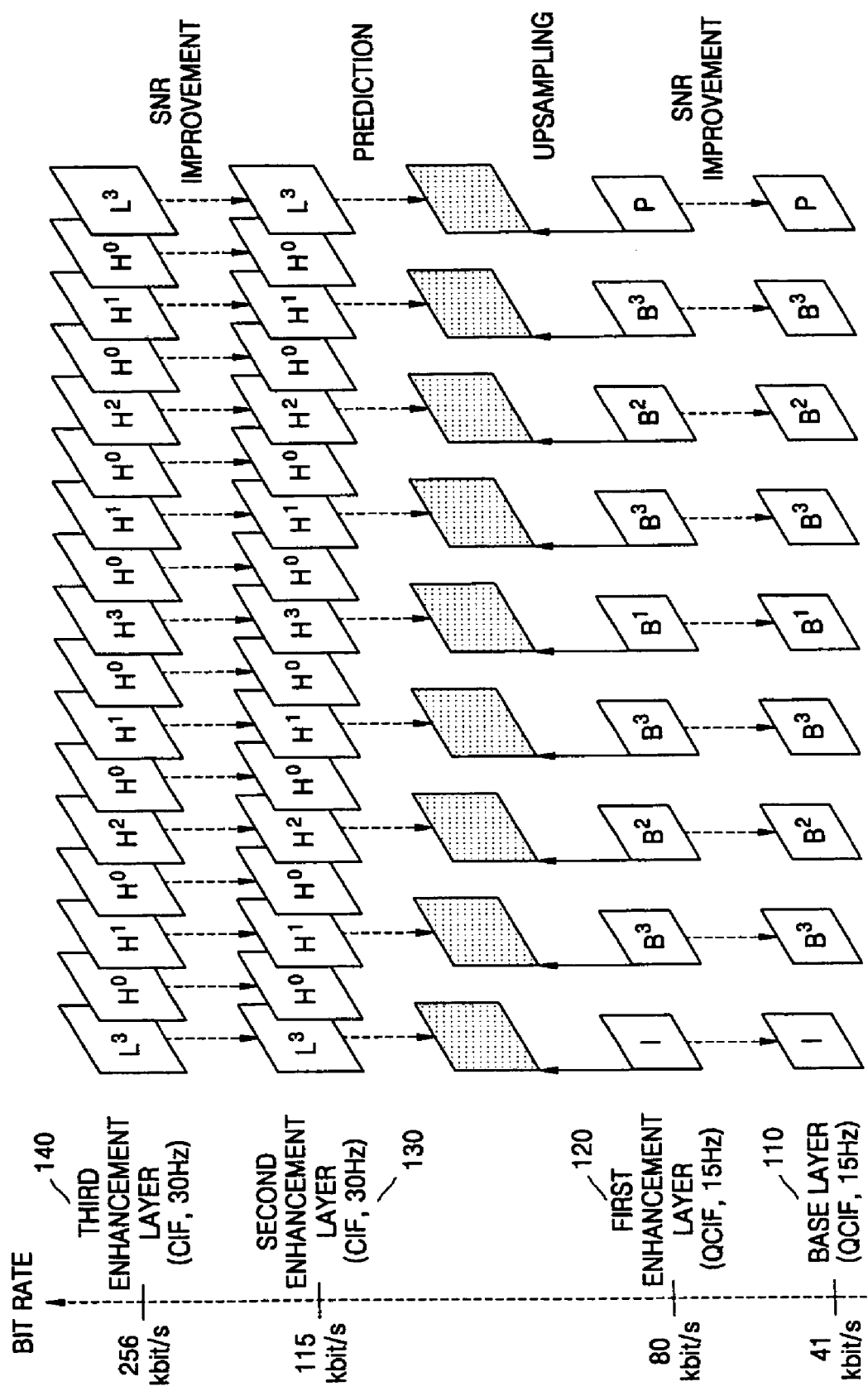
FIG. 1 is a view for explaining an example of video encoding using scalable video encoding.
Figure 2:
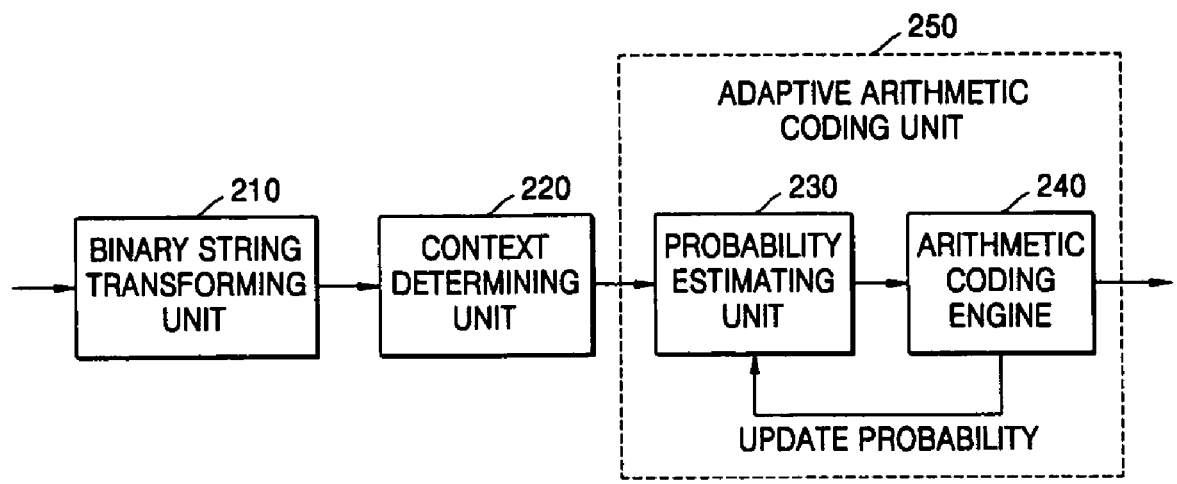
FIG. 2 is a block diagram of a context-based adaptive binary arithmetic coding (CABAC) encoder.

FIG. 2 is a block diagram of a CABAC encoder.

The CABAC encoder of FIG. 2 receives and encodes a syntax element (SE) and includes a binary string transforming unit 210, a context determining unit 220, and an adaptive arithmetic coding unit 250. The syntax element indicates data of a compressed bitstream and includes parameters required to express a video as a compressed format or analyze compressed data or header information, and residual information. For example, in H.264, parameters such as entropy_coding_mode_flag indicating which entropy encoding mode is used and mb_type indicating a macroblock type, header information, and residual information such as coeff_abs_level_minus1 are included in the syntax element.

The binary string transforming unit 210 receives the symbol value of the syntax element to be encoded and transmits it into a binary string. The binary string is a sequence of binary values such as 0 and 1. Table 1 shows examples of a binary string into which the symbol value of the macroblock type mb_type of a B slice defined in H.264 is transformed. Referring to Table 1, a symbol B_L0_16×16 of mb_type of the B slice indicates that a given macroblock is motion-compensated in 16×16 units by referring to an index L0 (List 0) and the symbol B_L0_16×16 has a value of 1. The symbol B_L0_16×16 is transformed into a binary string "100" having three binary values by the binary string transforming unit 210.

In Table 1, BinIdx indicates the position of a binary value in a binary string. For example, a binary value whose BinIdx is 0 is located at the beginning of a binary string. Mapping between symbol values and binary strings is generally defined for each syntax element.

TABLE 1

| Symbol value (symbol) of mb_type of B slice | Binary string |
|---|---|
| 0(B_Direct_16 × 16) | 0 |
| 1(B_L0_16 × 16) | 1 0 0 |
| 2(B_L1_16 × 16) | 1 0 1 |
| 3(B_Li_16 × 16) | 1 1 0 0 0 0 |
| 4(B_L0_L0_16 × 8) | 1 1 0 0 0 1 |
| 5(B_L0_8 × 16) | 1 1 0 1 1 0 |
| 6(B_L1_L1_16 × 8) | 1 1 0 0 1 1 |
| ... | ... |
| BinIdx | 0 1 2 3 4 5 6 |

After symbols of a given syntax element are transformed into binary strings, they are sequentially entropy-encoded by the adaptive arithmetic coding unit 250 by referring to contexts determined by the context determining unit 220. The context determining unit 220 determines a context corresponding to each of binary values 0 and 1 of a binary string. The context means a surrounding environment associated with a symbol to be encoded. The surrounding environment will be described later. Since the context is used for a probability estimating unit 230 to estimate a probability value for each of binary values 0 and 1, if the context of a binary value changes, a probability value for the binary value also changes. An arithmetic coding engine 240 performs arithmetic coding using a probability value estimated by the probability estimating unit 230 and updates a probability model of the probability estimating unit 230 corresponding to encoded 0 or 1. Hereinafter, determination of a context will be described with reference to FIGS. 3A and 3B.

Figure 3A:
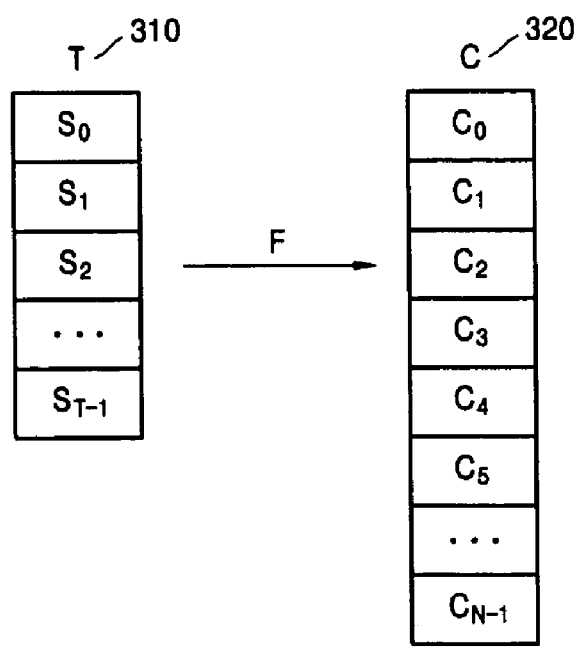
FIGS. 3A and 3B are reference diagrams for explaining the determination of a context.
Figure 3B:
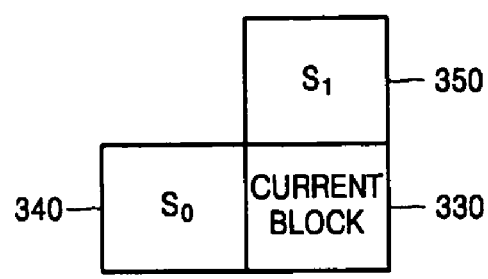

FIGS. 3A and 3B are reference diagrams for explaining determination of a context.

In FIG. 3A, T 310 is a context template and includes a subset of syntax elements encoded prior to a syntax element to be encoded. T 310 may include a part of a binary string corresponding to the symbol value of the syntax element to be encoded in addition to the subset or include only the part of the binary string. T 310 may include attributes of the syntax elements encoded prior to the syntax element to be encoded and the syntax element to be encoded in addition to the subset or include only the attributes. For example, a context template of CABAC includes a symbol $S_0$ of an adjacent block 340 located on the left side of a current block 330 having a symbol to be encoded and a symbol $S_1$ of an adjacent block 350 located above the block 330, as shown in FIG. 3B.

For example, in the case of the symbol mb_type of the B slice in Table 1, the context of a binary value whose BinIdx is 0 is determined by whether the symbols mb_type of left and above adjacent blocks are Direct or not. The context is also affected by whether the left and above adjacent blocks are skipped or do not exist. Thus, a context template required to encode the first binary value of the symbol mb_type includes the symbols mb_type of left and above adjacent blocks and attributes of the left and above adjacent blocks such as information about whether the left and above adjacent blocks are skipped or do not exist.

The context template may also include a binary value whose BinIdx is less than that of a binary value to be encoded. For example, in the symbol mb_type of Table 1, when the context of a binary value whose BinIdx is 2 is to be determined, a binary value whose BinIdx is 1 is used as the context template. Thus, the context of the binary value whose BinIdx is 2 changes according to whether an already encoded binary value, whose BinIdx is 1, is 0 or 1.

A modeling function F receives symbols $\{S_0, S_1, \ldots, S_{T-1}\}$ included in the context template T 310 for a given symbol value and determines a context from a context set C 320 $\{C_0, C_1, \ldots, C_{N-1}\}$. A modeling function for a binary value whose BinIdx is 0 in mb_type of Table 1 is as follows:

$$ctxIdx = condTermFlag(A) + condTermFlag(B) + Offset \quad (1),$$

where ctxIdx is an index indicating a determined context C, Offset is an initial value of an index indicating the start position of mb_type in a table in which contexts are defined, and condTermFlag(M) indicates the state of a block M. When the block M does not exist (condition 1) or is skipped (condition 2), or the symbol mb_type of the block M is Direct (condition 3), condTermFlag(M) is 0. In other words, one of the condition 1, the condition 2, and the condition 3 is satisfied, condTermFlag(M) is 0. Otherwise, condTermFlag(M) is 1. In an example of mb_type, the modeling function F is expressed as $F: T = \{S_0, S_1\} \rightarrow C = \{C_0, C_1, \ldots, C_{N-1}\}$. At this time, $S_0$ and $S_1$ are the symbols mb_type of the left adjacent block 340 and the above adjacent block 350 of the current block 330 as shown in FIG. 3B. More specifically, $S_0$=condTermFlag(A) and $S_1$=condTermFlag(B).

Thus, information about whether a block A and a block B exist or are skipped and symbols mb_type are input as a context template to obtain a context index ctxIdx, extracts a context having the obtained context index ctxIdx from a context set, and determines a context.

The determined context is used for the adaptive arithmetic coding unit 250 to estimate a probability value for each binary value. The adaptive arithmetic coding unit 250 includes the probability estimating unit 230 and the arithmetic coding engine 240. The probability estimating unit 230 receives a context corresponding to each of binary values obtained by the binary string transforming unit 210 and estimates a probability value for each binary value 0 or 1. A probability value corresponding to a context is determined by a mapping table between contexts and probability values. The determined probability value is used for the arithmetic coding engine 240 to encode a binary value. The arithmetic coding engine 240 sequentially encodes binary values and commands the probability estimating unit 230 to update a probability value according to each of the encoded binary values.

A general arithmetic encoder that performs arithmetic encoding on symbol values without binarization unlike the CABAC encoder has the same configuration and function as the CABAC encoder except for the binary string transforming unit 210. In the general arithmetic encoder, a context determining unit determines a context corresponding to a symbol value of a symbol, instead of determining a context corresponding to a binary value of a symbol.

Figure 4:
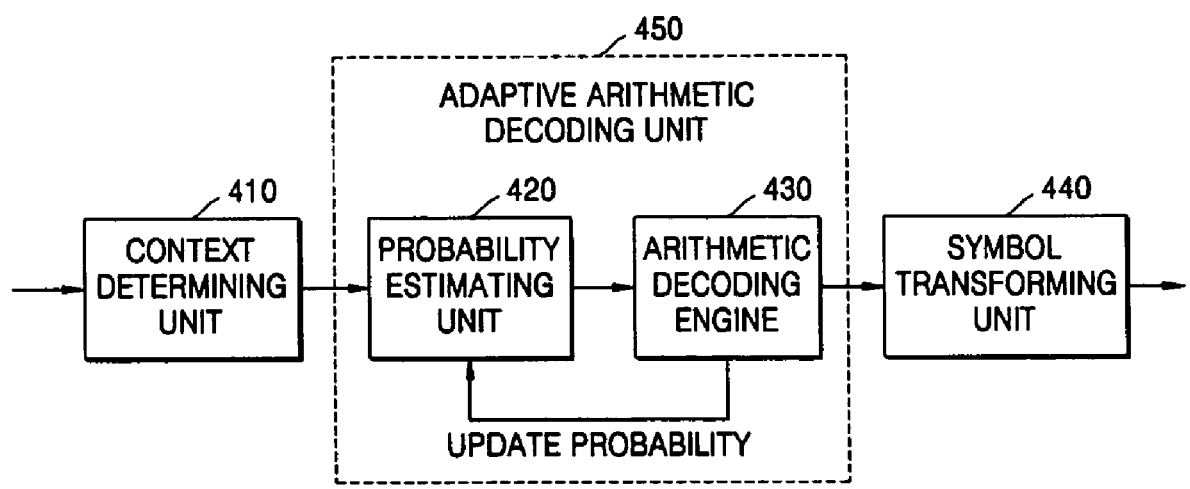
FIG. 4 is a block diagram of a CABAC decoder.

FIG. 4 is a block diagram of a CABAC decoder.

The CABAC decoder extracts a symbol from a compressed bitstream that is video data compressed by an encoder and composed of 0 and 1. The context determining unit 410 determines a context corresponding to each of a binary value to be decoded and determines a context according to the position of each of binary values of a binary string to be decoded. The determined context is used for an adaptive arithmetic decoding unit 450 to decode a binary value from the input bitstream. A probability estimating unit 420 receives a context and estimates a probability value for each of binary values 0 and 1. An arithmetic decoding engine 430 sequentially decodes binary values from the input bitstream using the estimated probability values and transmits the estimated probability values to the probability estimating unit 420 to update the probability values of the binary values. The binary values that are sequentially decoded by the adaptive arithmetic decoding unit 450 are transformed into symbol data by a symbol transforming unit 440. Mapping between symbols and binary values is made using the mapping table used by the binary string transforming unit 210 of the CABAC encoder as in Table 1.

A general arithmetic decoder in which an arithmetic decoding engine directly generates a symbol value unlike the CABAC decoder does not require the symbol transforming unit 440 of the CABAC decoder.

Figure 5:
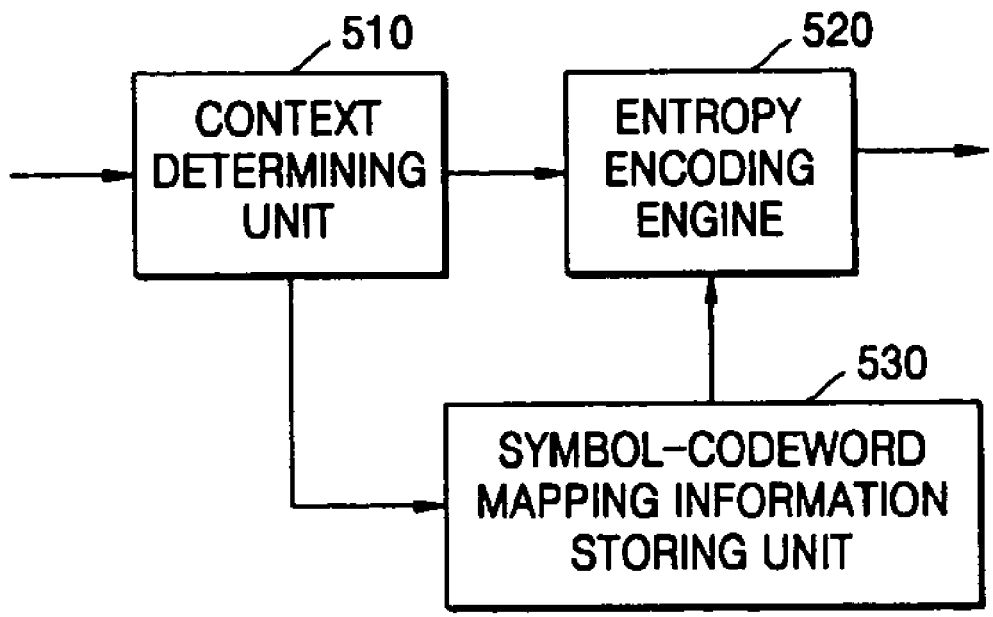
FIG. 5 is a block diagram of an entropy encoder that performs encoding using mapping information between symbols and codewords.

FIG. 5 is a block diagram of an entropy encoder that performs encoding using mapping information between symbols and codewords.

Encoding methods using mapping information between symbols and codewords include Huffman encoding, universal variable length coding (UVLC), and Exp-Golomb encoding. Table 2 shows an example of mapping information between symbols and codewords.

TABLE 2

| Symbol | Context 1 (0 ≤ nC < 2) | Context 2 (2 ≤ nC < 4) | Context 3 (4 ≤ nC < 8) | Context 4 (8 ≤ nC) | Context 5 (nC = −1) |
|---|---|---|---|---|---|
| 0 | 1 | 11 | 1111 | 0000 11 | 01 |
| 1 | 0001 01 | 0010 11 | 0011 11 | 0000 00 | 0001 11 |
| 2 | 01 | 10 | 1110 | 0000 01 | 1 |
| 3 | 0000 0111 | 0001 11 | 0010 11 | 0001 00 | 0001 00 |
| 4 | 0001 00 | 0011 11 | 0111 1 | 0001 01 | 0001 10 |
| 5 | 001 | 011 | 1101 | 0001 10 | 001 |
| 6 | 0000 0011 1 | 0000 111 | 0010 00 | 0010 00 | 0000 11 |
| 7 | 0000 0110 | 0010 10 | 0110 0 | 0010 01 | 0000 011 |
| 8 | 0000 101 | 0010 01 | 0111 0 | 0010 10 | 0000 010 |
| 9 | 0001 1 | 0101 | 1100 | 0010 11 | 0001 01 |

Referring to FIG. 5, the entropy encoder includes a context determining unit 510, an entropy encoding engine 520, and a symbol-codeword mapping information storing unit 530. The entropy encoding engine 520 outputs a codeword corresponding to an input symbol according to a context determined by the context determining unit 510 as shown in Table 2. At this time, the context determining unit 510 determines a context corresponding to a symbol to be encoded using a context template including symbols of adjacent blocks of a block having the symbol to be encoded or already encoded symbols. The entropy encoding engine 520 extracts mapping information corresponding to the determined context from the symbol-codeword mapping information storing unit 530 that stores a plurality of symbol-codeword mapping information and performs entropy-encoding on the input symbol. For example, in Table 2, when 0≦nC<2 is satisfied, a context 1 is determined by the context determining unit 510. Thus, the entropy encoding engine 520 outputs a codeword corresponding to the input symbol using symbol-codeword mapping information provided by the symbol-codeword mapping information storing unit 530.

Here, nC indicates the average number of non-zero transformation coefficients of the left and above adjacent blocks ($S_0$ and $S_1$ of FIG. 3B) of the block having the symbol to be encoded. In other words, nC means the average value of output non-zero transformation coefficients when the number of transformation coefficients of blocks ($S_0$ and $S_1$) is given as an input of a modeling function of FIG. 3A.

Figure 6:
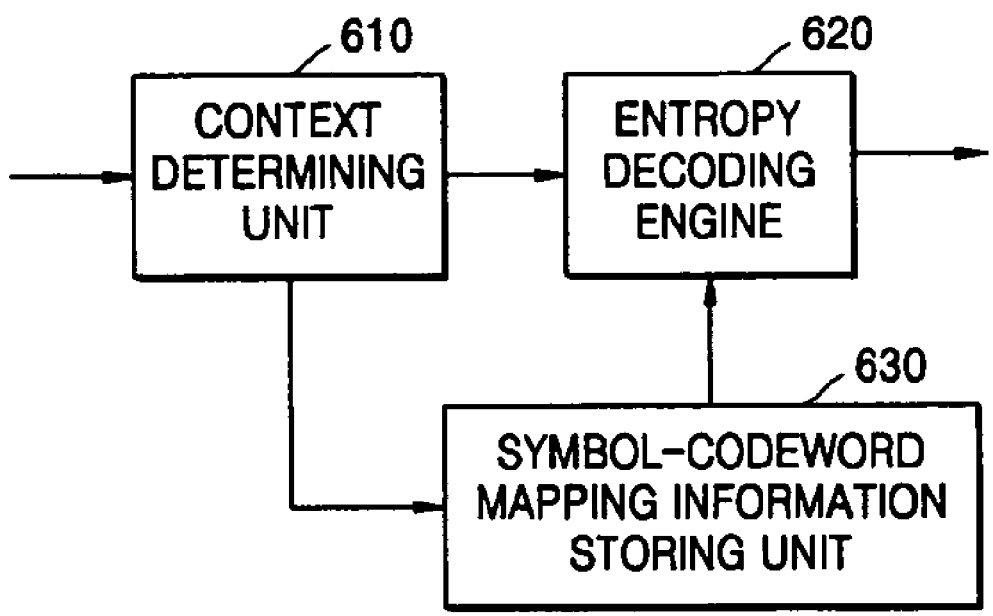
FIG. 6 is a block diagram of an entropy decoder that performs decoding using mapping information between symbols and codewords.

FIG. 6 is a block diagram of an entropy decoder that performs decoding using mapping information between symbols and codewords.

Decoding methods using mapping information between symbols and codewords include Huffman decoding, universal variable length decoding, and Exp-Golomb decoding. Referring to FIG. 6, the entropy decoder includes a context determining unit 610, an entropy decoding engine 620, and a symbol-codeword mapping information storing unit 630.

The context determining unit 610 determines a context corresponding to an entropy encoded syntax element. The symbol-codeword mapping information storing unit 630 stores a plurality of symbol-codeword mapping information that is previously defined as in Table 2. The entropy decoding engine 620 performs entropy decoding using the mapping information.

Since the adaptive entropy encoding methods control a probability value for each binary value or symbol adaptively according to a context, their encoding efficiency is superior to a case where the probability value is fixed. This is because when the probability value is fixed, a probability value that is previously trained for each symbol is used, resulting in a difference between the used probability value and the actual probability of each symbol. However, when the CABAC encoding method and the adaptive entropy encoding method are applied to a scalable video encoder, improvement may be achieved in terms of encoding efficiency. This is because when a CABAC method is applied to scalable video encoding, more accurate probability estimation is possible using a correlation between layers.

In other words, an entropy encoding method according to an exemplary embodiment of the present invention is based on a fact that more accurate statistical characteristics can be obtained by referring to not only symbols of syntax elements of the same type or different types from the syntax element to be encoded in the same layer but also symbols of the syntax elements of the same type or different types in lower layers when a symbol of a syntax element is entropy-encoded, thereby improving entropy-encoding efficiency. This is because a syntax element to be encoded may have a higher correlation with a syntax element in a lower layer than a syntax element included in an adjacent block in the same layer.

To this end, a context determining unit of an adaptive entropy encoder according to an exemplary embodiment of the present invention determines a context by referring to not only syntax elements in the same layer but also information of lower layers. Hereinafter, an operation of a context determining unit according to an exemplary embodiment of the present invention will be described in more detail with reference to FIGS. 7A and 7B.

Figure 7A:
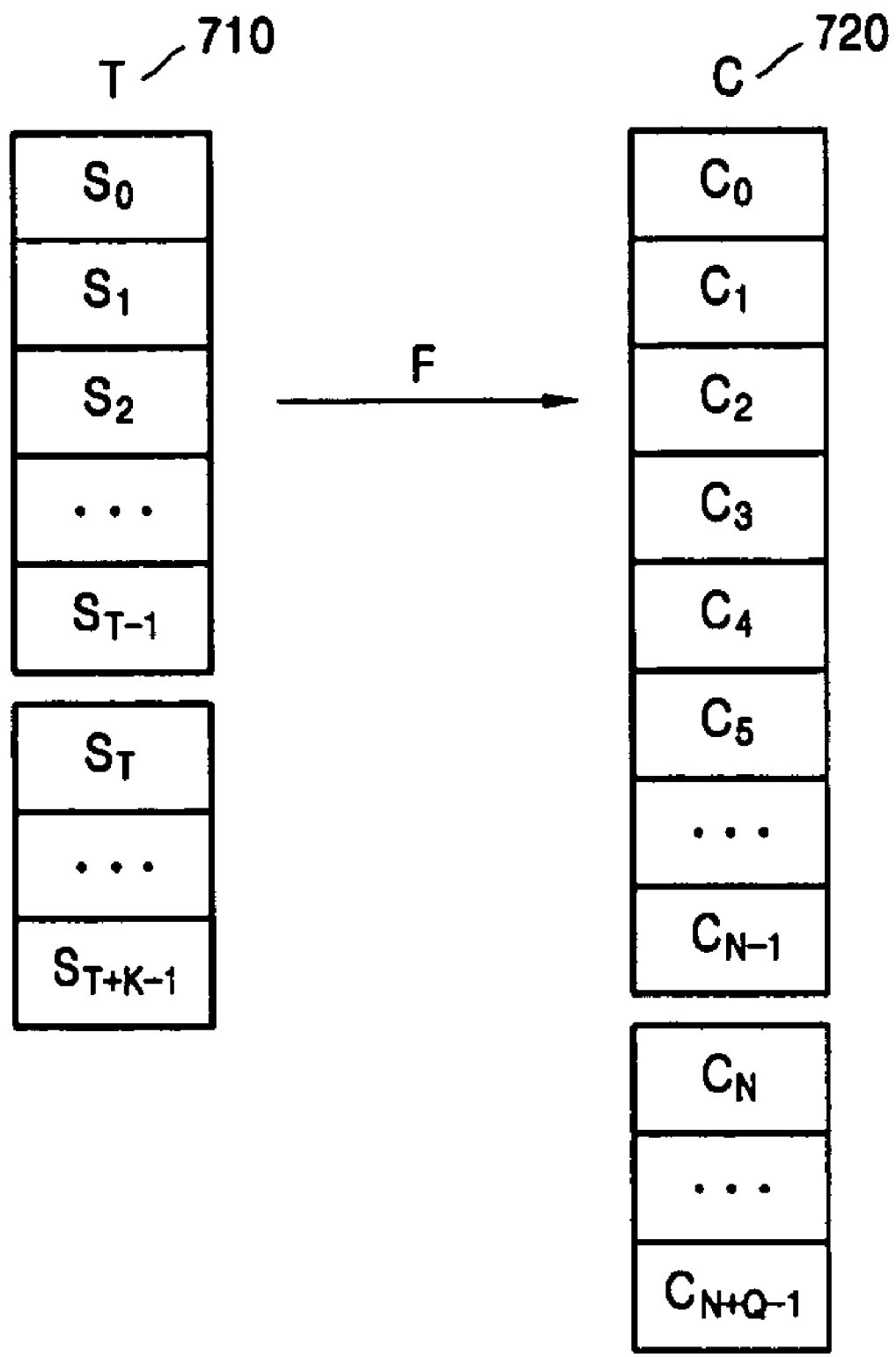
FIGS. 7A and 7B are reference diagrams for explaining an operation of a context determining unit according to an exemplary embodiment of the present invention.
Figure 7B:
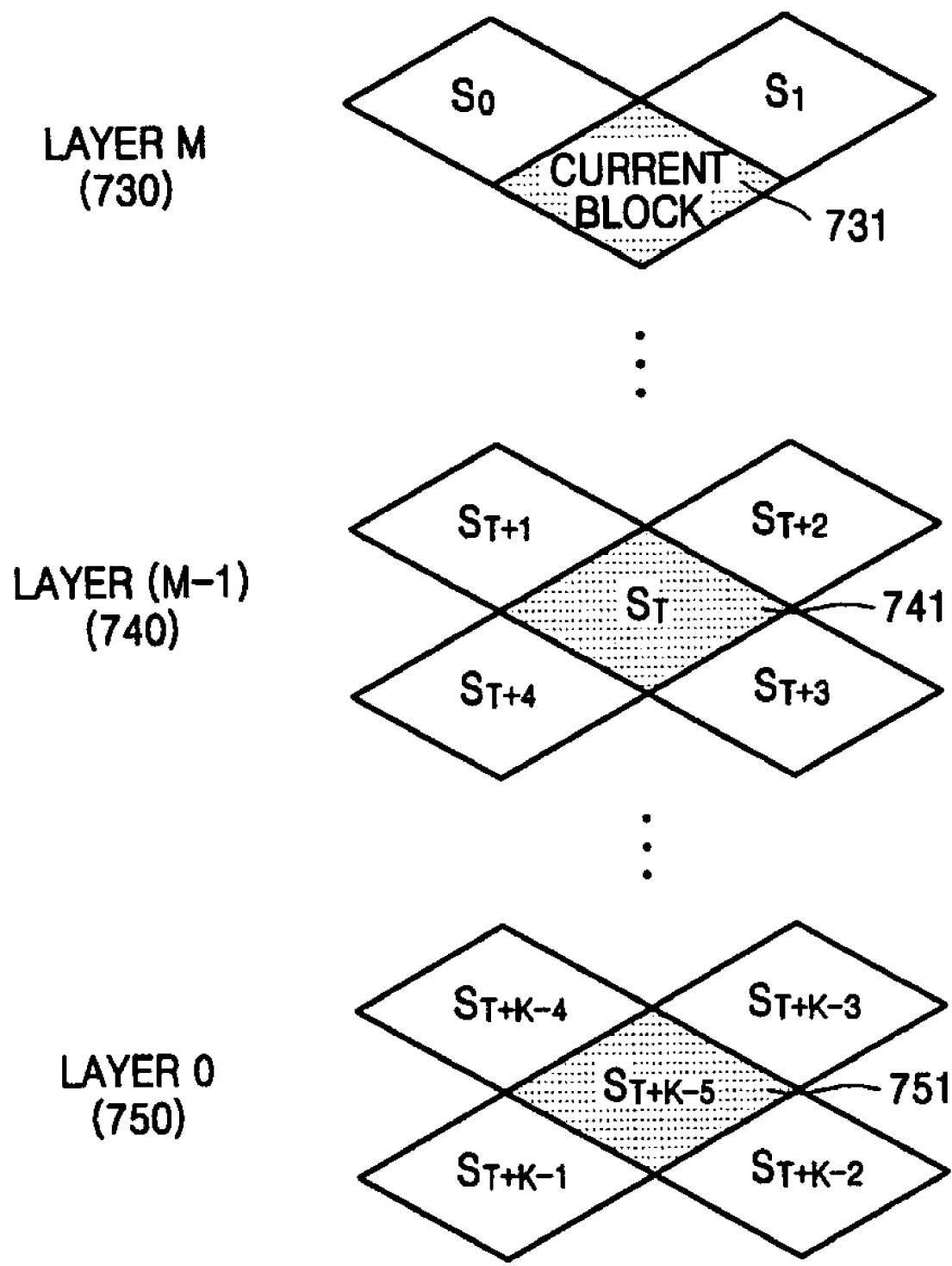

FIGS. 7A and 7B are reference diagrams for explaining an operation of a context determining unit according to an exemplary embodiment of the present invention.

Referring to FIGS. 7A and 7B, a context determining unit according to an exemplary embodiment of the present invention is different from a context determining unit of a conventional entropy encoder as follows. First, a context template T 710 includes symbols of syntax elements of the same type or different types from the syntax element to be encoded in lower layers and related attributes $\{S_T, S_{T+1}, \ldots, S_{T+K-1}\}$ in addition to a conventionally used context template $\{S_0, S_1 \ldots, S_{T-1}\}$. For example, when a current block 731 is included in an layer M 730 as shown in FIG. 7B, symbols $\{S_0$ and $S_1\}$ of adjacent blocks included in the layer M 730 and symbols $\{S_T, S_{T+1}, \ldots, S_{T+K-1}\}$ of each of lower layers of the layer M 730, i.e., layer (M−1) 740 through layer 0 750 are included in a context template T 710. As symbols of lower layers are included in the context template T 710, a context set C 720 includes new contexts $\{C_N, C_{N+1}, \ldots, C_{N+Q-1}\}$ in addition to existing contexts $\{C_0, C_1, \ldots, C_{N-1}\}$.

It is preferable that blocks of lower layers include a block located in the same position as a current block in a current layer and adjacent blocks of the block. Referring to FIG. 7B, a symbol $S_T$ 741 of the layer (M−1) 740 and a symbol $S_{T+K-5}$ 751 of the layer 0 750 are symbols of a block located in the same spatial position as the current block 731. When a picture size of a current layer is different from that of a lower layer, it is preferable that a block located in the same spatial position as the current block is determined after the picture sizes are matched through up-sampling or down-sampling.

A layer may be a temporal layer, a spatial layer, an SNR layer or a combination thereof according to the type of scalable video encoding.

FIGS. 8A through 8G are block diagrams of adaptive entropy encoders using a context determining unit according to exemplary embodiments of the present invention.

Figure 8A:
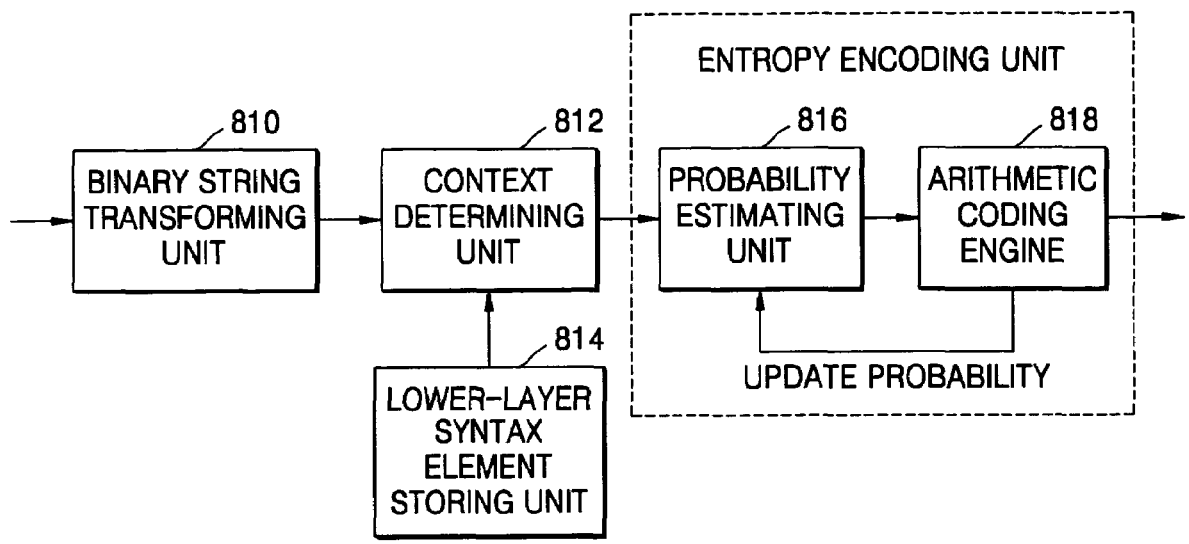
FIGS. 8A through 8G are block diagrams of adaptive entropy encoders using a context determining unit according to exemplary embodiments of the present invention.
Figure 8B:
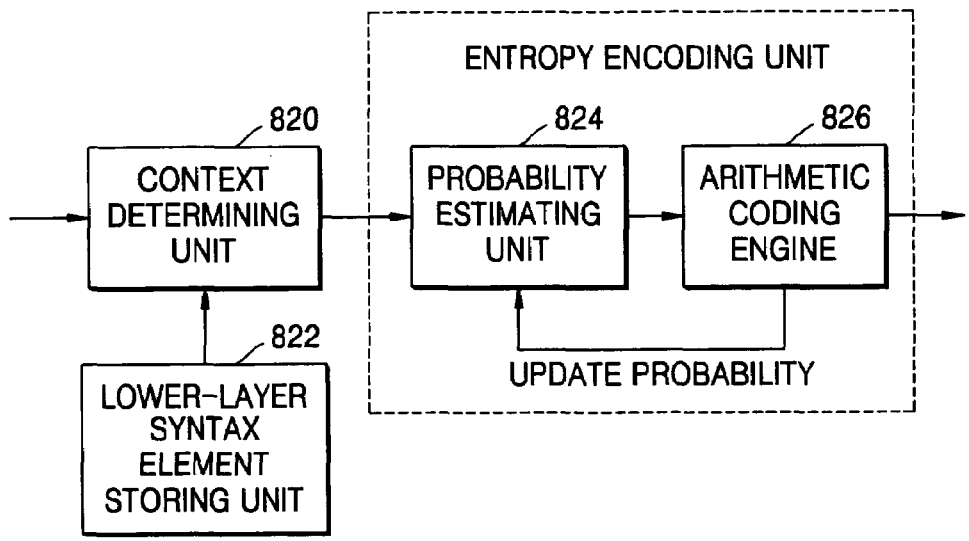
Figure 8C:
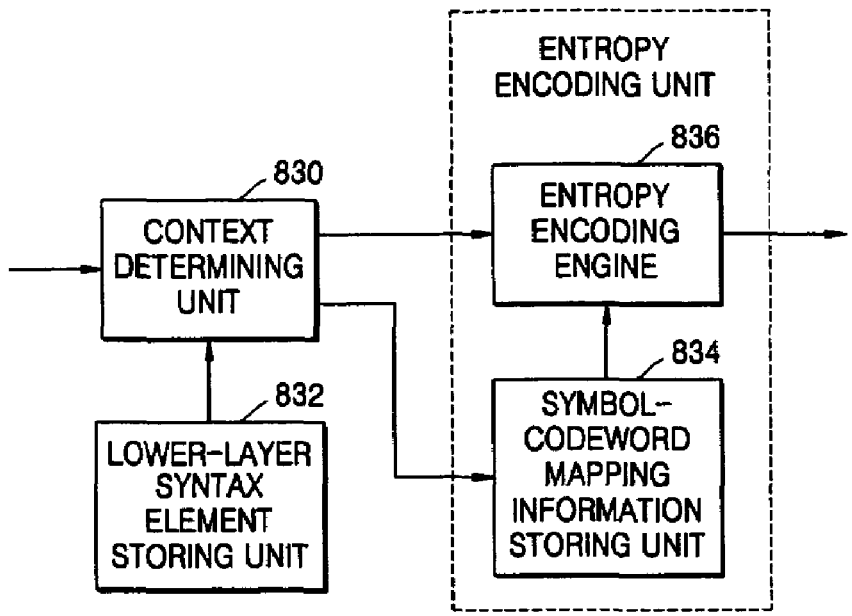
Figure 8D:
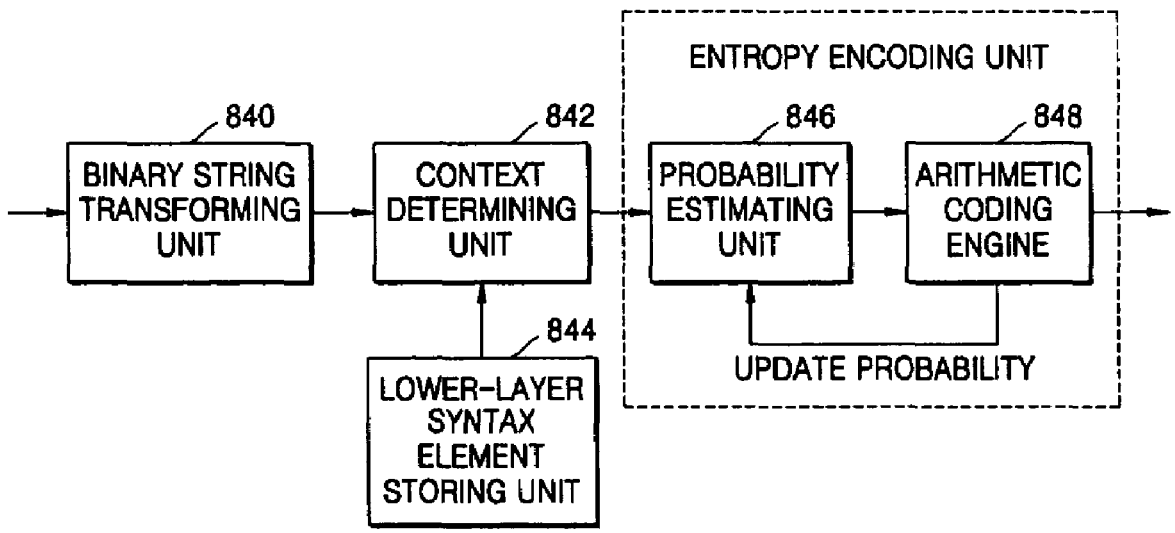

FIG. 8A is a block diagram of an adaptive entropy encoder using CABAC as an entropy encoding method, FIG. 8B is a block diagram of an adaptive entropy encoder using a general arithmetic encoding method as an entropy encoding method, FIG. 8C is a block diagram of an adaptive entropy encoder using encoding using mapping information between symbols and codewords as an entropy encoding method, and FIG. 8D is a block diagram of a CABAC encoder using information of lower layers for binarization.

In the adaptive entropy encoder of FIG. 8A, a binary string transforming unit 810 transforms a symbol of a syntax element into a binary string. A context determining unit 812 determines a context corresponding to each binary value of the binary string. When a context corresponding to each binary value is determined, not only syntax element information in the same layer but also syntax element information in lower layers is read from a lower-layer syntax element storing unit 814 and is added to a context template for use in context determination. A probability estimating unit 816 searches for a probability value using the context determined by the context determining unit 812, and an arithmetic coding engine 818 receives a probability value and a binary value and performs arithmetic coding.

In the adaptive entropy encoder of FIG. 8B, since transformation of a symbol value into a binary string is not required unlike the adaptive entropy encoder of FIG. 8A using a CABAC encoding method, the binary string transforming unit 810 is not included. Thus, a context determining unit 820 of FIG. 8B reads not only syntax element information in the same layer but also syntax element information in lower layers from a lower-layer syntax element storing unit 822, adds the read syntax element information to a context template, and determines a context corresponding to a symbol to be encoded. A probability estimating unit 824 searches for a probability value using the context determined by the context determining unit 820 and an arithmetic coding engine 826 performs arithmetic coding on an input symbol.

In the adaptive entropy encoder of FIG. 8C, a context determining unit 830 reads not only syntax element information in the same layer but also syntax element information in lower layers from a lower-layer syntax element storing unit 832, adds the read syntax element information to a context template, and determines a context corresponding to a symbol to be encoded. The determined context is used for selecting one from a plurality of mapping information of a symbol-codeword mapping information storing unit 834. An entropy encoding engine 836 outputs a codeword corresponding to an input symbol using the selected symbol-codeword mapping information.

In the adaptive entropy encoder of FIG. 8D, syntax element information in lower layers is used not only in a context determining unit 842 but also in a binary string transforming unit 840 for symbol binarization. In other words, when a symbol of a given syntax element is encoded, the binary string transforming unit 840 of the CABAC encoder transforms a symbol into a binary string using symbols of syntax elements of the same type or different types from the given syntax element in the same layer or lower layers or attributes of syntax elements. In other words, when a symbol is transformed into a binary string, only a syntax element in the same layer or both syntax elements in the same layer and syntax elements in lower layers may be referred to. A lower-layer syntax element storing unit 844, a context determining unit 842, a probability estimating unit 846, and an arithmetic coding engine 848 are the same as those of the adaptive entropy encoder of FIG. 8A.

Figure 8E:
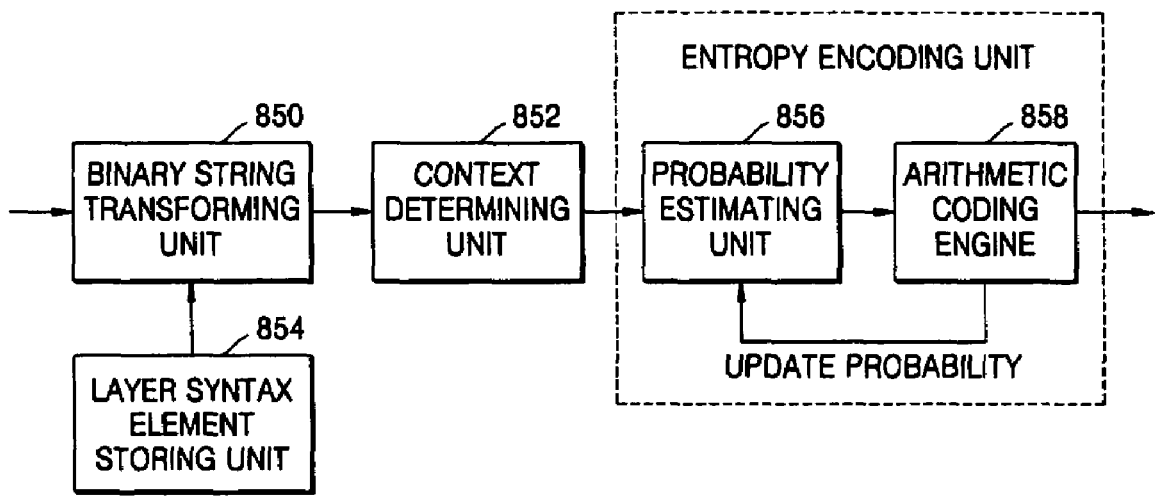

A method for adaptively transforming a symbol into a binary string with reference to syntax elements in the same layer, syntax elements in the same layer and lower layers, or syntax elements in lower layers improves coding efficiency regardless of whether a context determining unit refers to syntax elements in lower layers or syntax elements in the same layer. A related exemplary embodiment of the present invention is shown in FIG. 8E. In other words, a context determining unit 852 refers to only syntax element information in the same layer as described with reference to FIG. 2 and a binary string transforming unit 850 refers to only one of syntax elements in the same layer, syntax elements in the same layer and lower layers, and syntax elements in lower layers. Thus, a layer syntax element storing unit 854 stores only one of syntax elements in the same layer, syntax elements in the same layer and lower layers, and syntax elements in lower layers according to the selection of reference information.

As detailed implementation methods of the binary string transforming units 840 and 850, a plurality of mapping tables between symbol values of symbols and binary strings may be stored and one of them may be selected according to the selection of reference information or a fixed mapping table between symbols values of symbols and binary values may be used and a relationship between the symbols and the symbol values may be re-mapped according to the selection of reference information. In the former, a binary string corresponding to a symbol changes. For example, a binary string "100" corresponding to a symbol value of 1 of a symbol mb_type is replaced with another and thus another mapping table is created. In the latter, only mapping between symbol values and binary strings changes in a fixed mapping table as shown in Table 1. For example, when a binary string corresponding to a symbol value of 1 is "100" and a binary string corresponding to a symbol value of 2 is "101", the binary string corresponding to the symbol value of 1 is changed into "101" and the binary string corresponding to the symbol value of 2 is changed into "100".

Figure 8F:
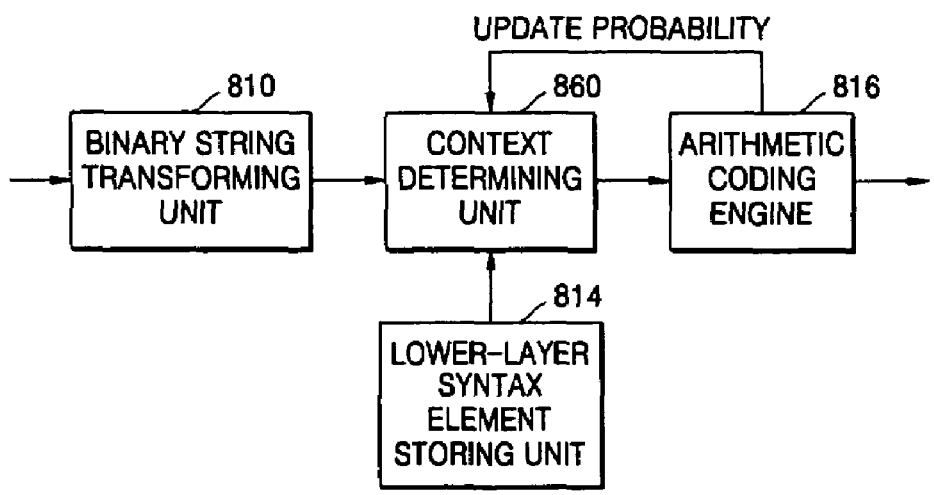
Figure 8G:
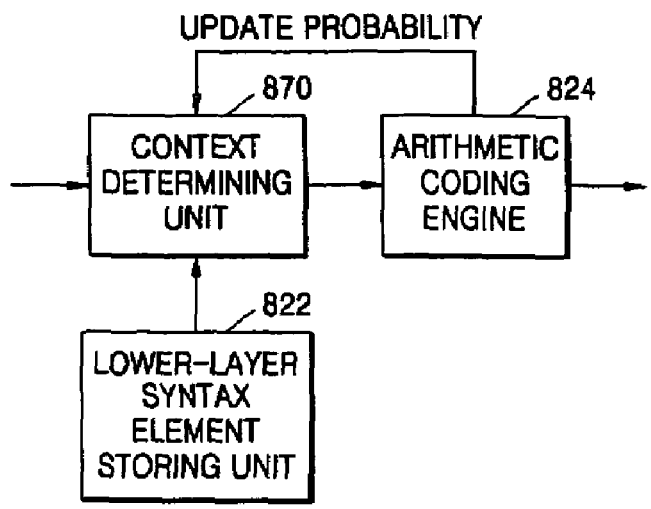

Although the context determining units 812 and 820 and the probability estimating units 816 and 824 may be separated as shown in FIGS. 8A and 8B, a context determining unit 860 may be implemented by adding the function of the probability estimating unit 816 to the context determining unit 812 of FIG. 8A as shown in FIG. 8F and a context determining unit 870 may be implemented by adding the function of the probability estimating unit 824 to the context determining unit 820 of FIG. 8B as shown in FIG. 8G. The probability estimating units 816 and 824 determine a specific probability value using a context determined by the context determining units 812 and 820 in FIGS. 8A and 8B, but the context determining units 860 and 870 determine a specific probability value in FIGS. 8F and 8G. The context determining units 860 and 870 also perform a probability update function.

Such changes can also be made in FIGS. 8D and 8E.

FIGS. 9A through 9G are block diagrams of adaptive entropy decoders using a context determining unit according to exemplary embodiments of the present invention.

Figure 9A:
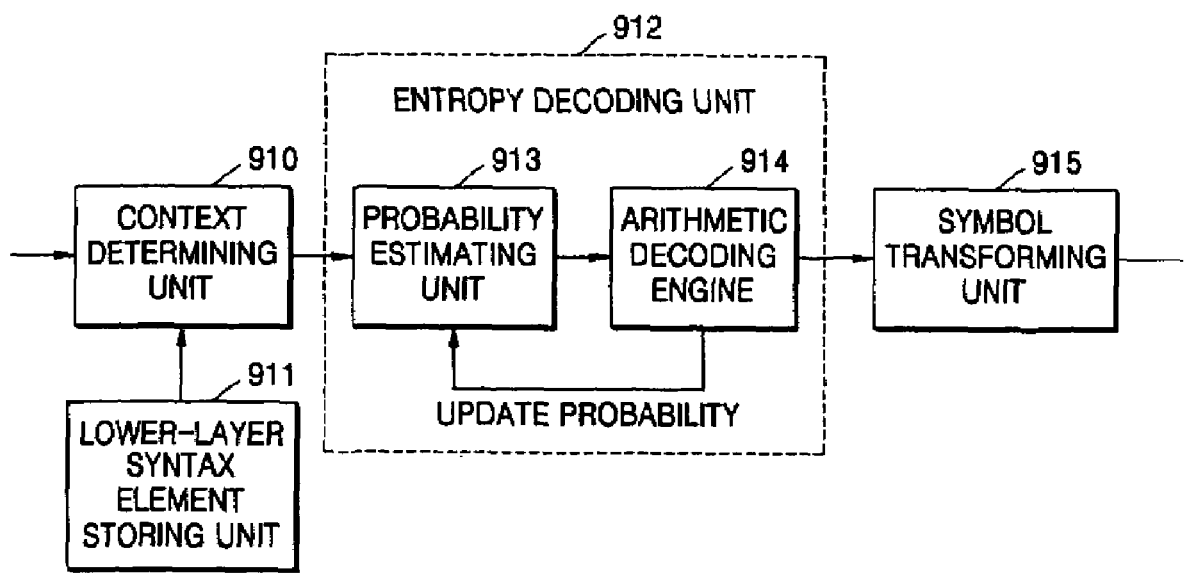
FIGS. 9A through 9G are block diagrams of adaptive entropy decoders using a context determining unit according to exemplary embodiments of the present invention.
Figure 9B:
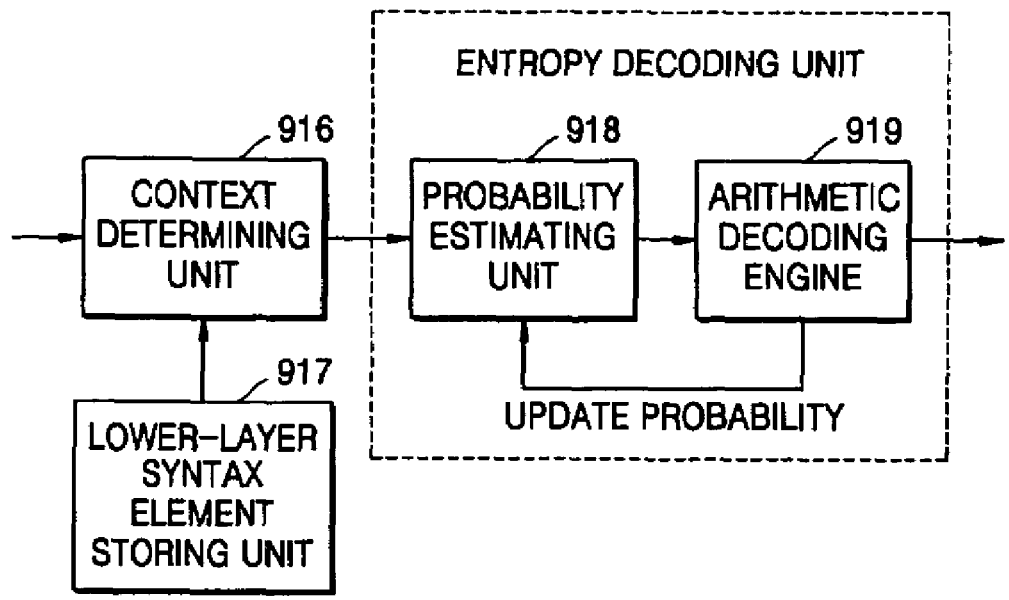
Figure 9C:
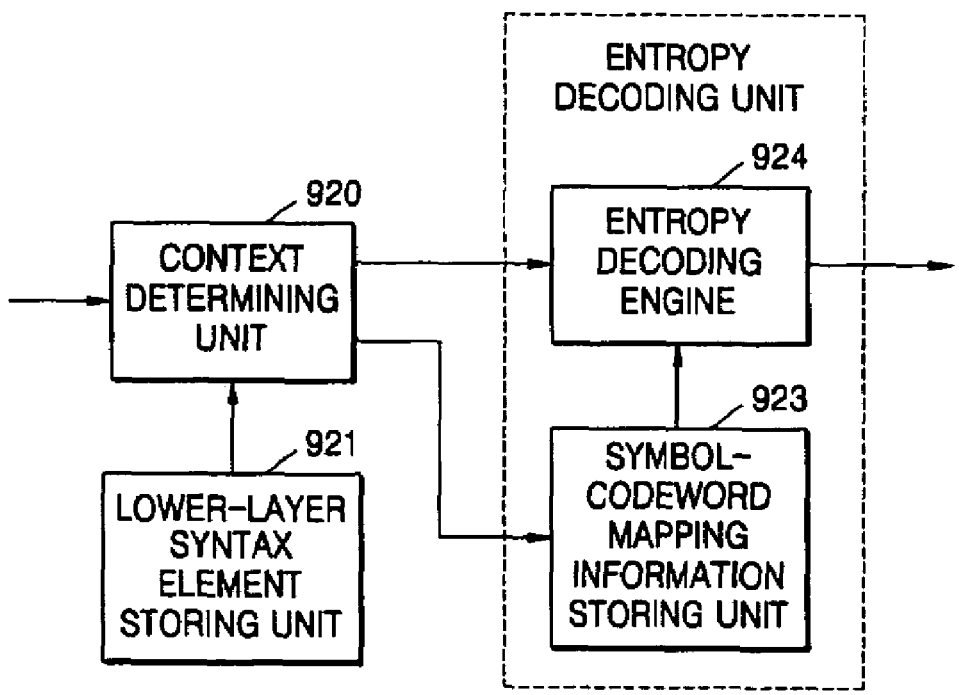
Figure 9D:
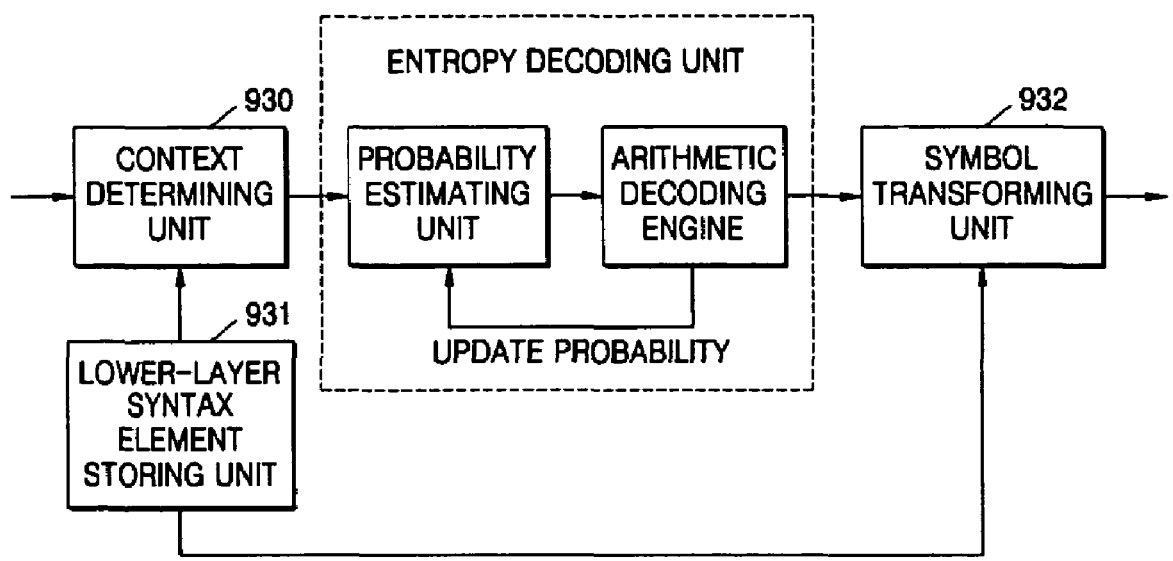

More specifically, FIGS. 9A through 9D are block diagrams of an entropy decoder corresponding to the entropy encoder of FIGS. 8A through 8D. Thus, FIG. 9A is a block diagram of an entropy decoder using CABAC (context-based adaptive binary arithmetic coding as an entropy decoding method. FIG. 9B is a block diagram of an entropy decoder using a general arithmetic decoding method as an entropy decoding method. FIG. 9C is a block diagram of an entropy decoder using decoding using mapping information between symbols and codewords as an entropy decoding method. FIG. 9D is a block diagram of a CABAC decoder using information of lower layers for binarization.

In the entropy decoder of FIG. 9A, a context determining unit 910 determines a context corresponding to a binary value to be decoded from an entropy encoded bitstream and determines the context according to the position of the binary value in a binary string to be decoded. When determining a context corresponding to each binary value, the context determining unit 910 reads not only syntax element information in the same layer but also syntax element information in lower layers from a lower-layer syntax element storing unit 911 and adds the read syntax element information to a context template for use in context determination. The determined context is used for an entropy decoding unit 912 to decode a binary value from an input bitstream. A probability estimating unit 913 receives a context and estimates a probability value for each of binary values 0 and 1. An arithmetic decoding engine 914 sequentially decodes binary values from the input bitstream using the estimated probability values and transmits them to the probability estimating unit 913 to update the probability values of the binary values. The binary values sequentially decoded by the arithmetic decoding engine 914 are transformed into symbol data by a symbol transforming unit 915.

A general arithmetic decoder whose arithmetic decoding engine generates a symbol value unlike the CABAC decoder has the same configuration and function as the CABAC decoder except for the symbol transforming unit 915. However, detailed implementation may be different and thus different reference numerals are used.

In the entropy decoder of FIG. 9C, a context determining unit 920 reads not only syntax element information in the same layer but also syntax element information in lower layers from a lower-layer syntax element storing unit 921 using symbol values of symbols instead of binary values of the symbols, adds the read syntax element information to a context template, and determines a context. The determined context is used for selecting one from a plurality of mapping information of a symbol-codeword mapping information storing unit 923. An entropy decoding engine 924 outputs a symbol corresponding to a codeword using the selected symbol-codeword mapping information.

In the entropy decoder of FIG. 9D, syntax element information in lower layers stored in a lower-layer syntax element storing unit 931 is used not only in a context determining unit 930 but also for transformation of a binary value into a symbol in a symbol transforming unit 932. A detailed transformation process is inverse to a binary string transformation process described with reference to FIG. 8D.

Figure 9E:
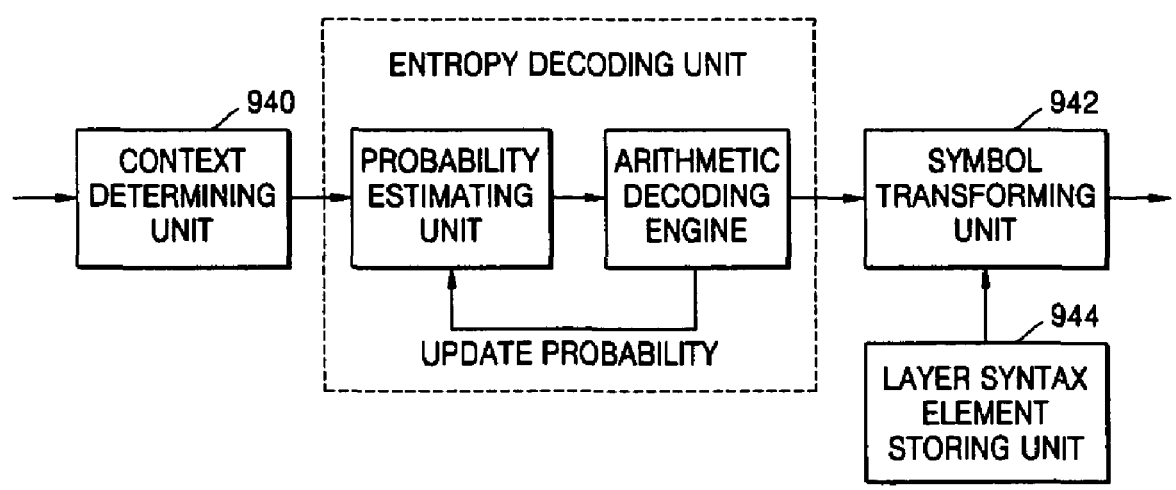

A method for adaptively transforming a binary value into a symbol with reference to syntax elements in the same layer, syntax elements in the same layer and lower layers, or syntax elements in lower layers improves coding efficiency regardless of whether a context determining unit refers to syntax elements in lower layers or syntax elements in the same layer. A related exemplary embodiment of the present invention is shown in FIG. 9E. In other words, a context determining unit 940 refers to only syntax element information in the same layer as described with reference to FIG. 4 and a symbol transforming unit 942 refers to only one of syntax elements in the same layer, syntax elements in the same layer and lower layers, and syntax elements in lower layers. Thus, a layer syntax element storing unit 944 stores only one of syntax elements in the same layer, syntax elements in the same layer and lower layers, and syntax elements in lower layers according to the selection of reference information.

Figure 9F:
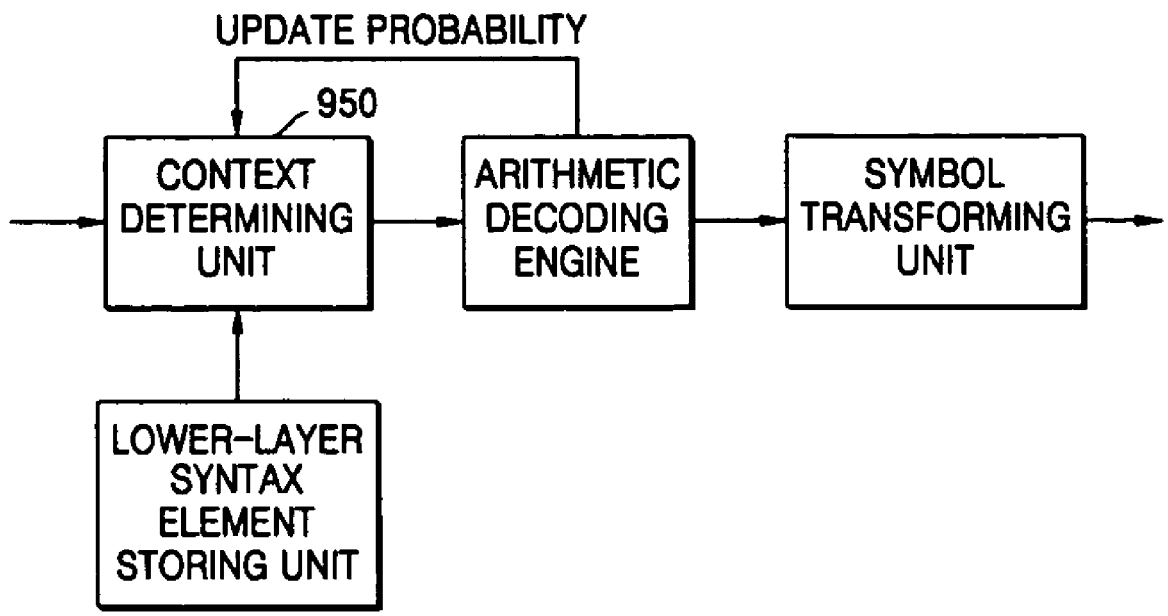
Figure 9G:
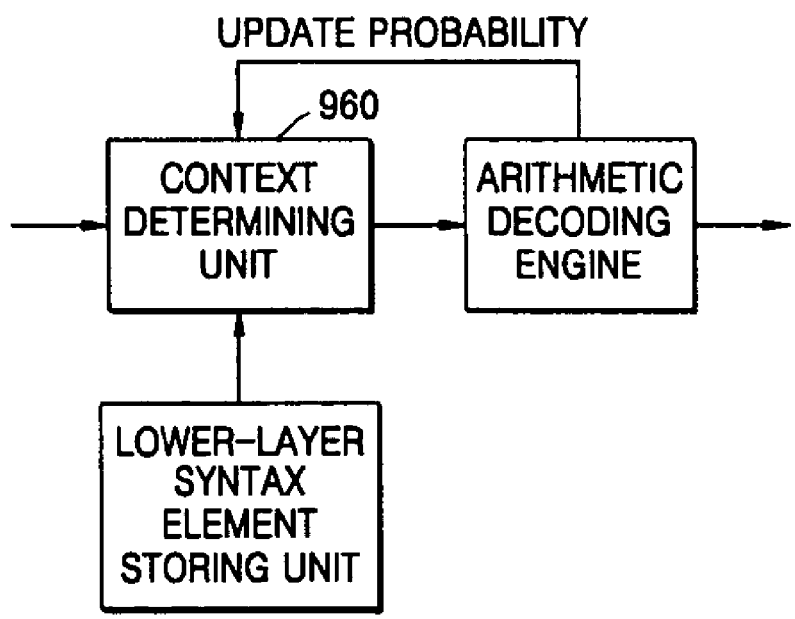

Although the context determining units 910 and 916 and the probability estimating units 913 and 918 may be separated as shown in FIGS. 9A and 9B, a context determining unit 950 may be implemented by adding the function of the probability estimating unit 913 to the context determining unit 910 of FIG. 9A as shown in FIG. 9F and a context determining unit 960 may be implemented by adding the function of the probability estimating unit 918 to the context determining unit 916 of FIG. 9B as shown in FIG. 9G. The probability estimating units 913 and 918 determine a specific probability value using a context determined by the context determining units 910 and 916 in FIGS. 9A and 9B, but the context determining units 950 and 960 determine a specific probability value in FIGS. 9F and 9G. The context units 950 and 960 also perform a probability update function.

Figure 10A:
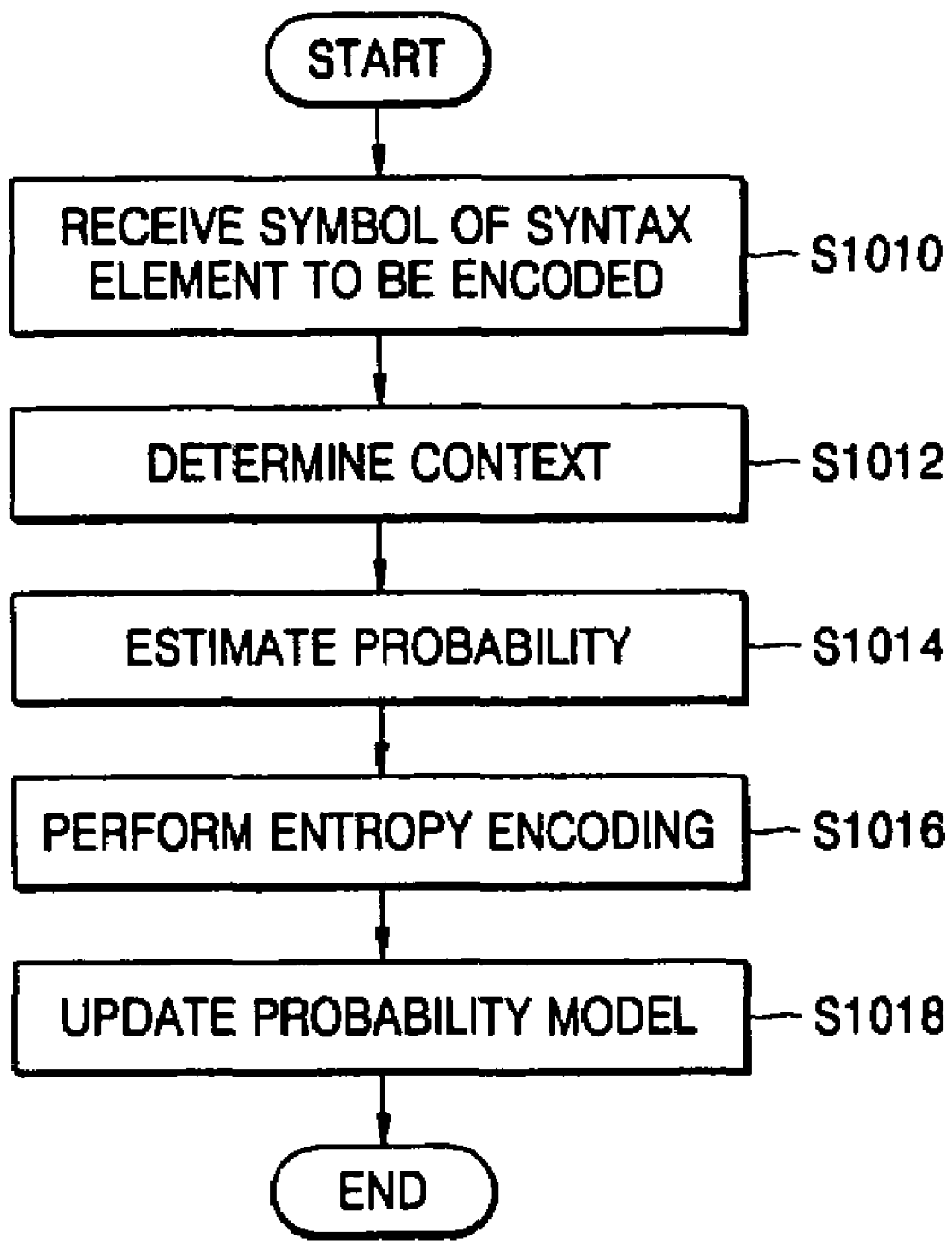
FIGS. 10A through 10C are flowcharts illustrating entropy encoding methods according to exemplary embodiments of the present invention.
Figure 10B:
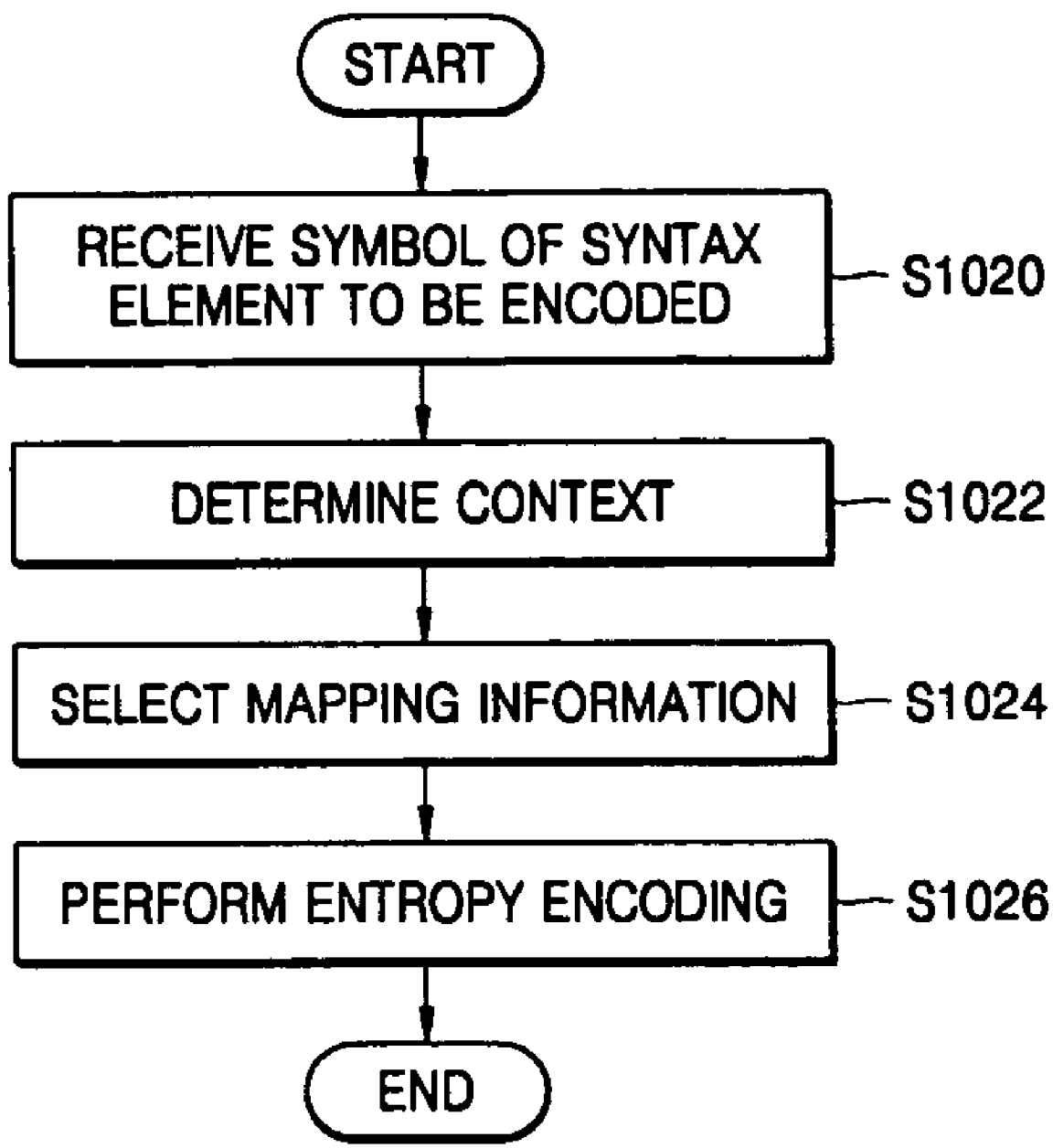
Figure 10C:
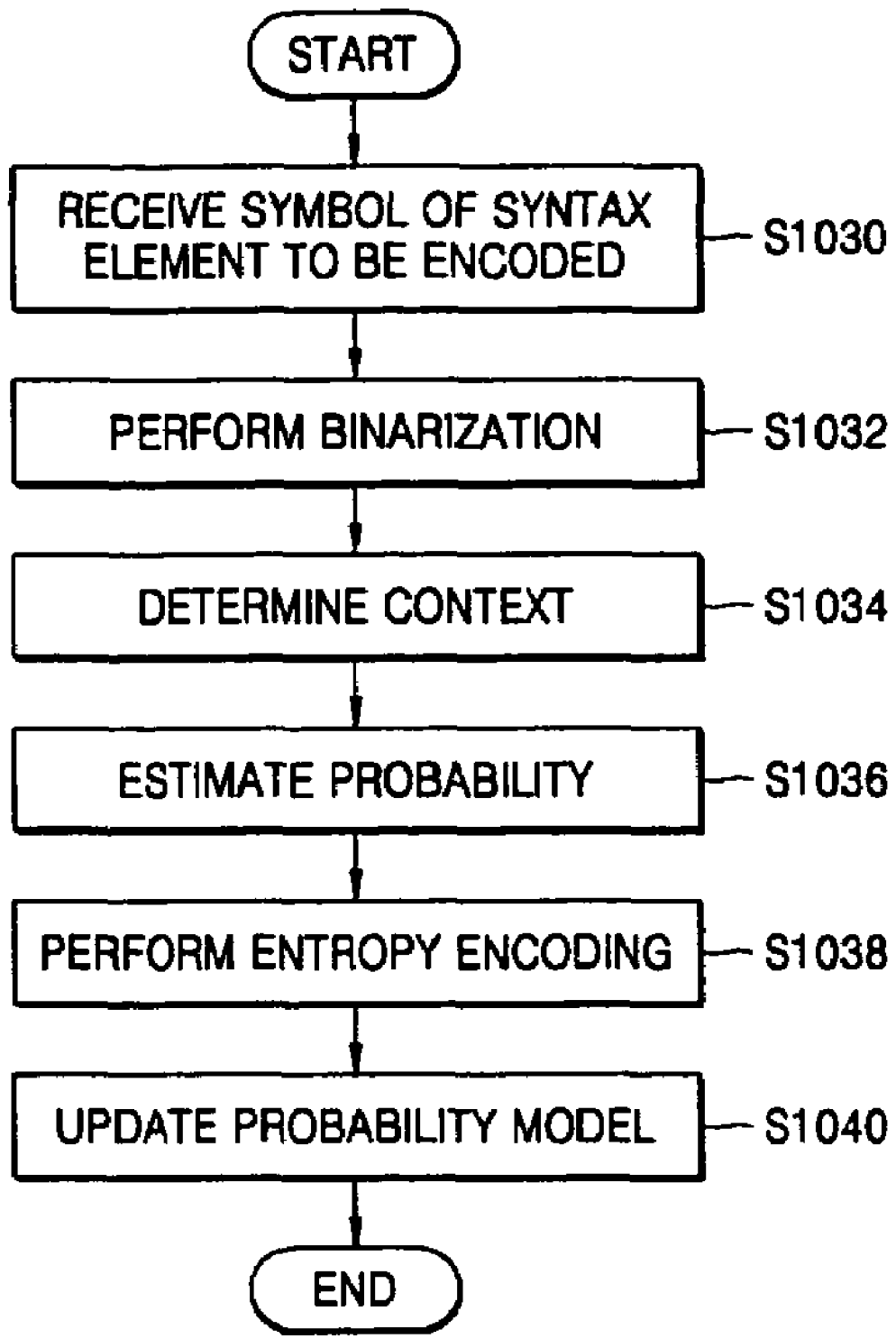

FIGS. 10A through 10C are flowcharts illustrating entropy encoding methods according to exemplary embodiments of the present invention.

Referring to FIG. 10A, a symbol of a syntax element to be encoded is input in operation S1010. The symbol of the input syntax element may be transformed into a binary string. An example of transformation into a binary string is as described with reference to Table 1. A context corresponding to the symbol value of the syntax element or each binary value of the binary string is determined in operation S1012. At this time, when the context is determined by referring to syntax elements in the same layer as a block including the syntax element and lower layers of the layer or only syntax elements in the lower layers. Context determination is as described with reference to FIGS. 7A and 7B.

A probability value for the syntax element is estimated according to the determined context in operation S1014 and entropy encoding is performed using the estimated probability value. When the symbol of the syntax element is transformed into a binary string for entropy encoding as described with reference to Table 1, a probability value for each of binary values 0 and 1 is estimated and the symbol value of the input syntax element or binary values corresponding to the input syntax element are entropy-encoded in operation S1016. A probability model is updated according to the entropy-encoded symbol values or binary values in operation S1018. Context determining operation S1012 and probability estimating operation S1014 may be integrated into one operation and thus a probability value for the syntax element may be estimated by referring to syntax elements in the same layer as a block including the syntax element and lower layers of the layer or only syntax elements in the lower layers, without explicit determination of a context.

Hereinafter, an entropy encoding method according to another exemplary embodiment of the present invention will be described with reference to FIG. 10B. A symbol of a syntax element to be encoded is input in operation S1020 and a context corresponding to the syntax element is determined in operation S1022. Context determining operation S1022 is the same as context determining operation S1012 of FIG. 10A. One of a plurality of symbol-codeword mapping information is selected according to the determined context in operation S1024 as described with reference to FIG. 8C. Entropy encoding is performed on the syntax element according to the selected symbol-codeword mapping information in operation S1026, and thus a codeword corresponding to the input symbol is output. In FIG. 10B, context determining operation S1022 and mapping information selecting operation S1024 may also be integrated into one operation and thus symbol-codeword mapping information can be selected for the syntax element by referring to syntax elements in the same layer as a block including the syntax element and lower layers of the layer or only syntax elements in the lower layers, without explicit determination of a context.

Hereinafter, a CABAC entropy encoding method using information in the same layer or lower layers for binarization will be described with reference to FIG. 10C. A symbol of a syntax element to be encoded is input in operation S1030. The symbol of the syntax element is transformed into a binary string in operation S1032. In transformation of a symbol into a binary string, a binary string corresponding to each symbol is determined according to syntax element information in the same layer or lower layers. In other words, each symbol of a given syntax element is transformed into a binary string using one of syntax elements of the same type or different types from the given syntax element in the same layer, syntax elements of the same type or different types in the same layer and lower layers, and the syntax elements of the same type or different types in the lower layers, or attributes of syntax elements. In other words, when a symbol is transformed into a binary string, only one of a syntax element in the same layer, both syntax elements in the same layer and syntax elements in lower layers, and syntax elements in the lower layers may be referred to.

A context corresponding to each binary value of a symbol of the syntax element is determined in operation S1034. At this time, the context is determined by referring to only one of syntax elements in the same layer as a block including the syntax element, syntax elements in the same layer and lower layers, and syntax elements in the lower layers. The determination of a context is as described with reference to FIGS. 7A and 7B.

A probability value for the syntax element is estimated according to the determined context in operation S1036 and entropy encoding is performed using the estimated probability value. When the symbol of the syntax element is transformed into a binary string for entropy encoding as described with reference to Table 1, a probability value for each of binary values 0 and 1 is estimated and the syntax element is entropy encoded using the estimated probability value in operation S1038. A probability model is updated according to symbol values and binary values of the entropy-encoded syntax element in operation S1040. Context determining operation S1034 and probability estimating operation S1036 may be integrated into one operation and thus a probability value for the syntax element may be estimated by referring to syntax elements in the same layer as a block including the syntax element and lower layers of the layer or only syntax elements in the lower layers, without explicit determination of a context.

Figure 11A:
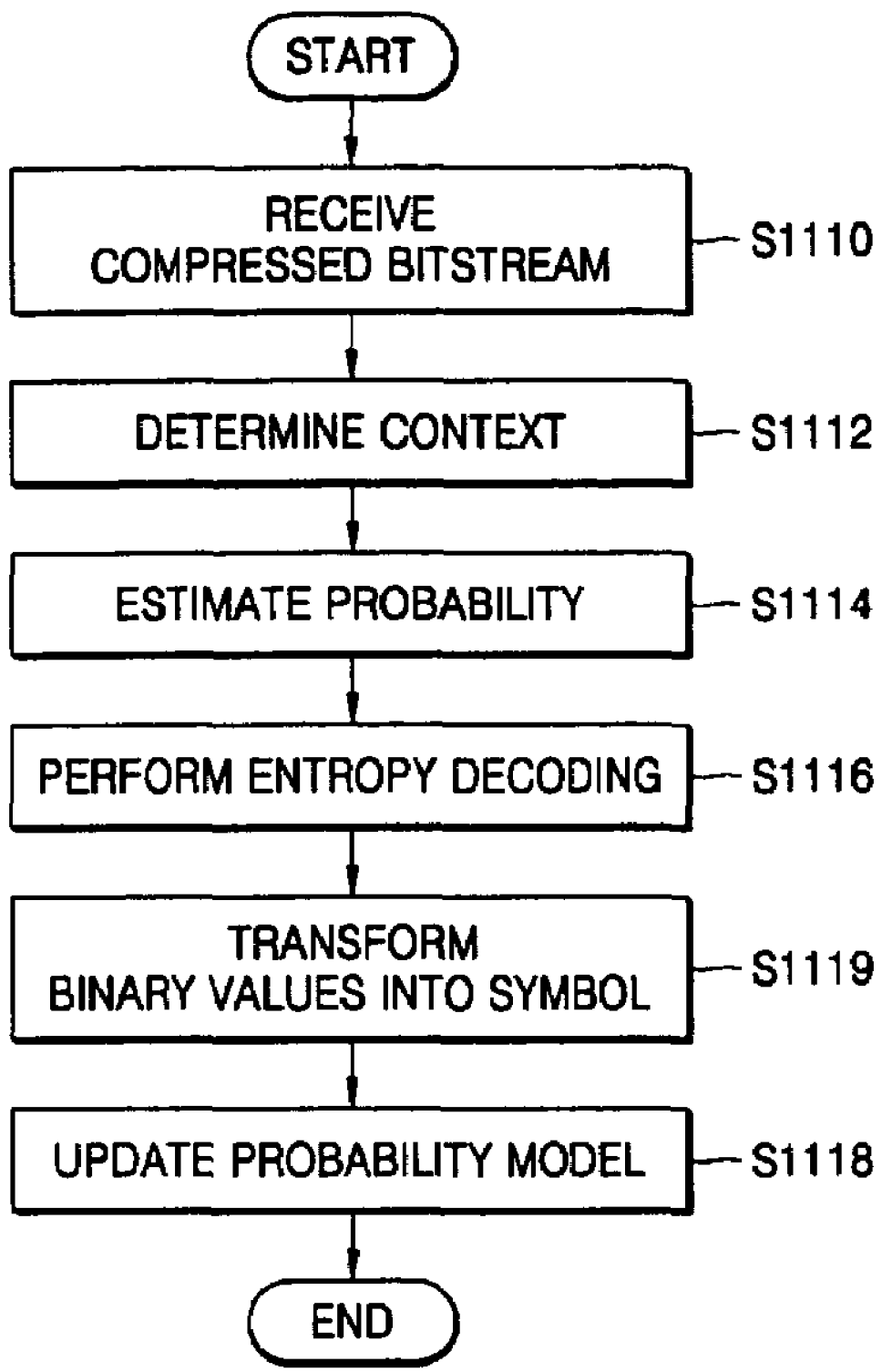
FIGS. 11A through 11C are flowcharts illustrating entropy decoding methods according to exemplary embodiments of the present invention.
Figure 11B:
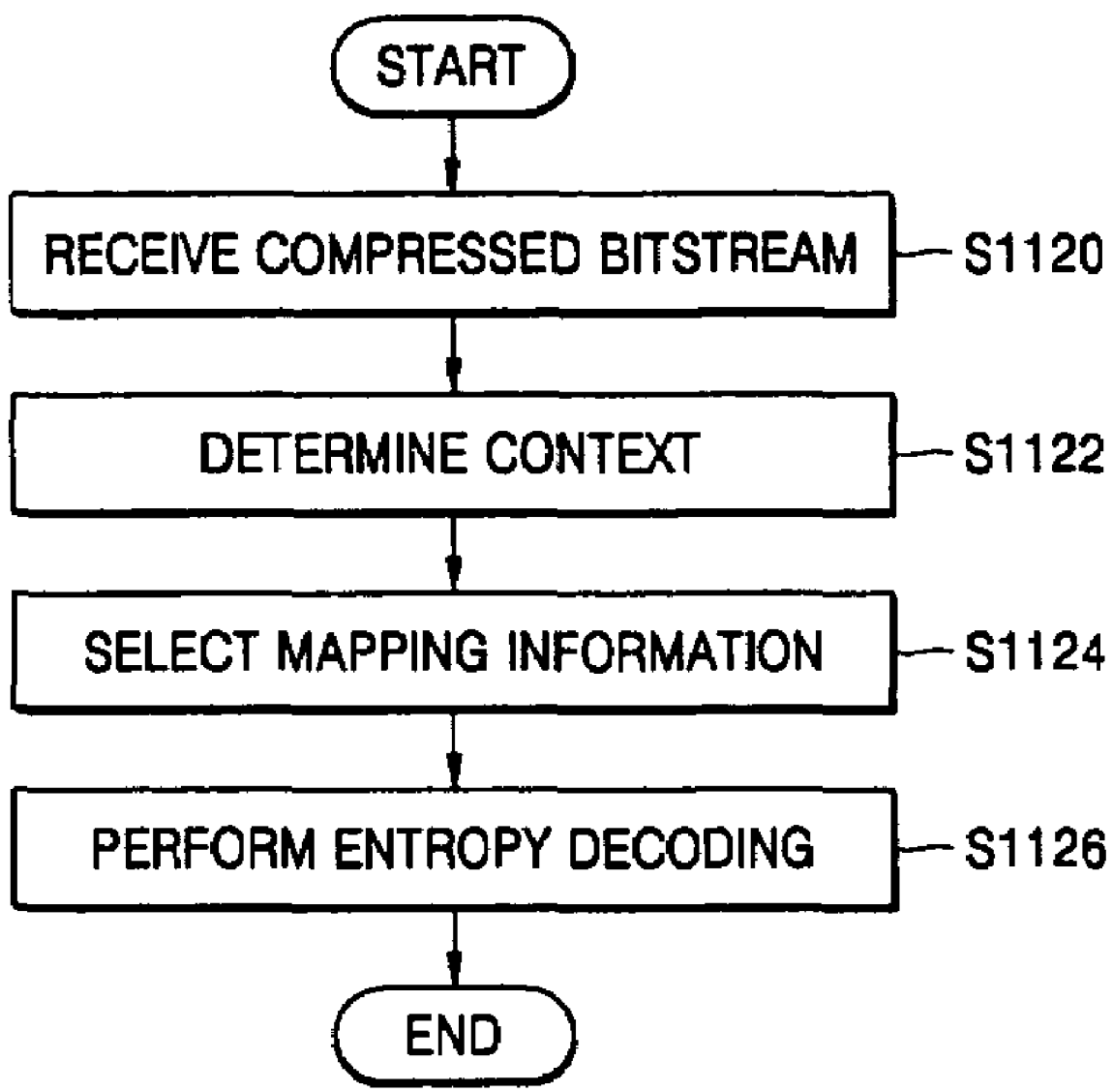
Figure 11C:
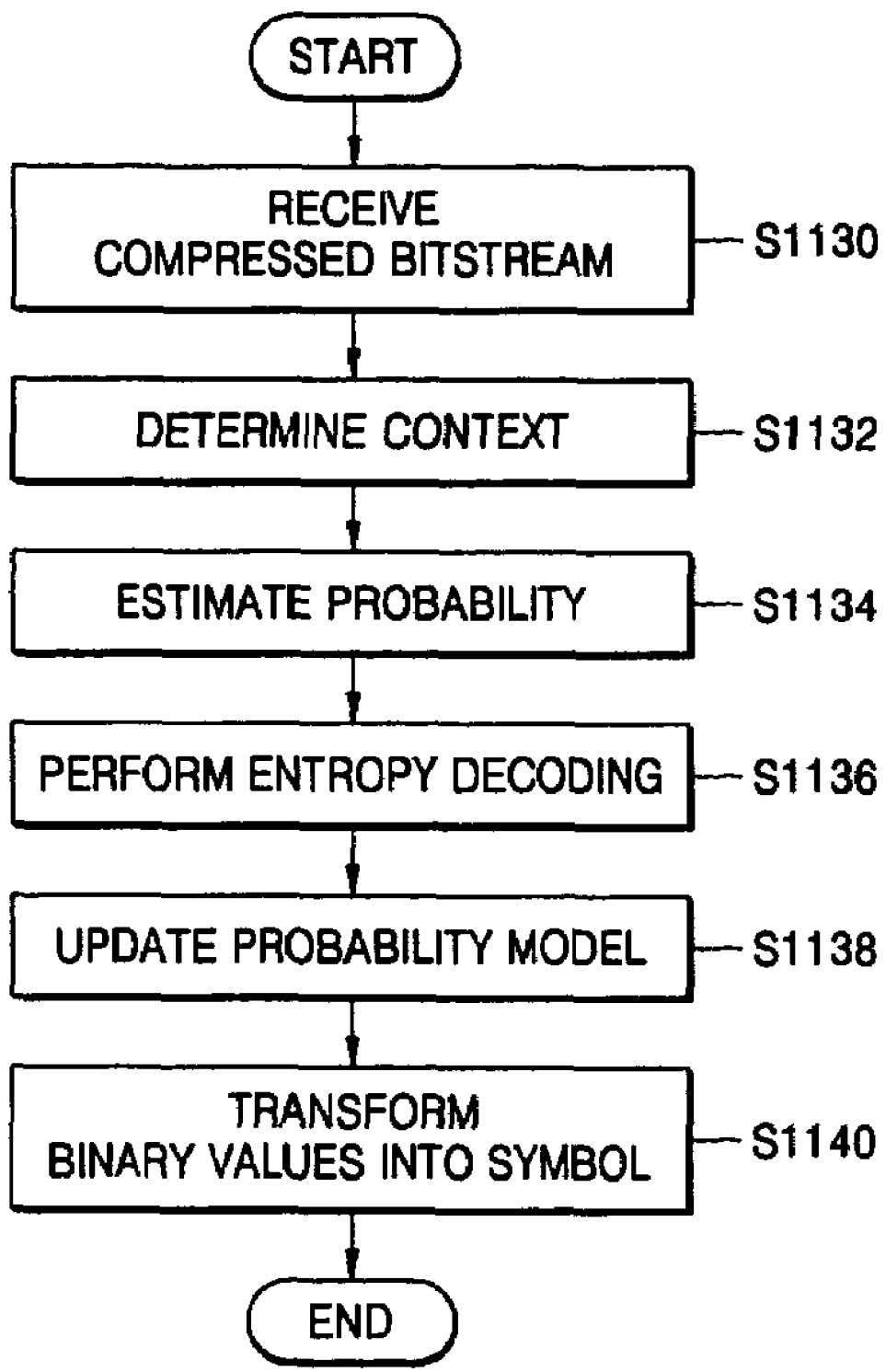

FIGS. 11A through 11C are flowcharts illustrating entropy decoding methods according to exemplary embodiments of the present invention.

Hereinafter, an entropy decoding method using CABAC will be described with reference to FIG. 11A. A compressed bitstream is input in operation S1110 and a context is determined according to the position of each binary value of a binary string to be decoded in operation S1112. When a context corresponding to each binary value is determined in operation S1112, not only syntax element information in the same layer but also syntax element information in lower layers are referred to as described with reference to FIG. 9A. The determination of a context is as described with reference to FIGS. 7A and 7B. A probability value for each of binary values 0 and 1 is estimated according to the determined context in operation S1114. Entropy decoding in which binary values are sequentially decoded from the compressed bitstream is performed using the estimated probability value in operation S1116. A probability model for each of binary values 0 and 1 is updated according to the sequentially decoded binary values in operation S1118. The entropy-decoded binary values are transformed into a symbol in operation S1119. Symbol transforming operation S1119 is as described with reference to the symbol transforming unit 915 of FIG. 9A.

The entropy decoding method of FIG. 11A can also be applied to a general arithmetic decoding method that generates a symbol value in entropy decoding operation S1116 unlike the entropy decoding method using CABAC. In this case, symbol transforming operation S1119 of FIG. 11A is skipped and a description with reference to FIG. 11A is applied. However, since a symbol value is decoded instead of a binary value in entropy decoding operation S1116, a context corresponding to a symbol to be decoded is determined in context determining operation S1112. A probability value for each symbol value is estimated according to the determined context in operation S1114. When the context is determined in operation S1112, not only syntax element information in the same layer but also syntax element information in lower layers are referred to. After entropy decoding operation S1116 in which a symbol value is decoded from the compressed bitstream using the estimated probability value is performed, a probability model for the decoded symbol value is updated according to the decoded symbol value in operation S1118.

Hereinafter, a decoding method using symbol-codeword mapping information will be described with reference to FIG. 11B. A compressed bitstream is input in operation S1120. Syntax element information in the same layer as a block including a symbol to be decoded and syntax element information in tower layers of the layer are read and are added to a context template to determine a context corresponding to the symbol to be decoded in operation S1122. One of a plurality of mapping information is selected using the determined context in operation S1124 as described with reference to FIG. 9C. A symbol corresponding to a codeword of the compressed bitstream is output using the selected symbol-codeword mapping information in operation S1126.

Hereinafter, a CABAC decoding method using information in the same layer or lower layers for binarization will be described with reference to FIG. 11C. A compressed bitstream is input in operation S1130 and a context is determined according to the position of each binary value of a binary string to be decoded in operation S1132. A probability value for each of binary values 0 and 1 is estimated according to the determined context in operation S1134. Entropy decoding is performed to sequentially decode binary values from the compressed bitstream using the estimated probability value in operation S1136. A probability model for each of binary values 0 and 1 is updated according to the sequentially decoded binary values in operation S1138. The entropy-decoded binary values are transformed into a symbol in operation S1140. Symbol transforming operation S1140 is as described with reference to FIG. 9E. In other words, when binary values are transformed into a symbol, one of symbols of syntax elements of the same type or different types from a syntax element to be decoded in the same layer as the syntax element to be decoded, symbols of syntax elements of the same type or different types in the same layer and lower layers, and symbols of the syntax elements of the same type or different types in the lower layers, or attributes of syntax elements are referred to.

A method for adaptively transforming binary values into a symbol with reference to syntax elements in the same layer, syntax elements in the same layer and lower layers, or syntax elements in lower layers improves coding efficiency regardless of whether syntax elements in lower layers or syntax elements in the same layer are referred to in the determination of a context.

Figure 12:
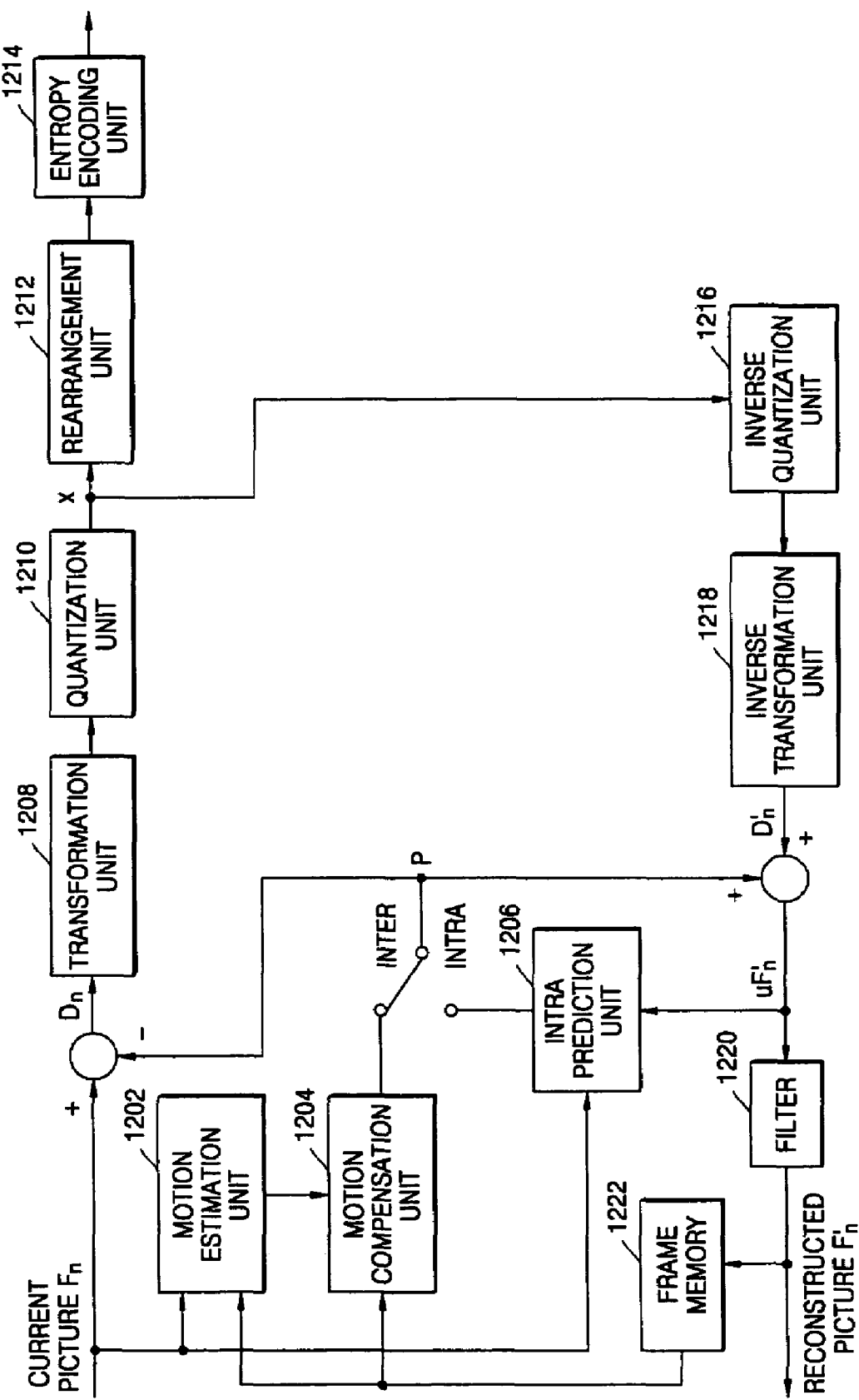
FIG. 12 is a block diagram of a video encoder having an entropy encoder according to an exemplary embodiment of the present invention.

FIG. 12 is a block diagram of a video encoder having an entropy encoder according to an exemplary embodiment of the present invention.

The video encoder includes a motion estimation unit 1202, a motion compensation unit 1204, an intra prediction unit 1206, a transformation unit 1208, a quantization unit 1210, a rearrangement unit 1212, an entropy encoding unit 1214, an inverse quantization unit 1216, an inverse transformation unit 1218, and a frame memory 1222.

The video encoder encodes a macroblock of a current picture in a mode selected from among various encoding modes. To this end, rate-distortion (RD) costs are calculated by performing encoding in all the possible modes of inter prediction and intra prediction, a mode having the smallest RD cost is selected as the optimal encoding mode, and encoding is performed in the selected optimal encoding mode. For inter prediction, the motion estimation unit 1202 searches in a reference picture for a prediction value of a macroblock of a current picture. If the motion estimation unit 1202 searches for a reference block in units of a ½ pixel or a ¼ pixel, the motion compensation unit 1204 calculates an intermediate pixel and determines data of the reference block. As such, inter prediction is performed by the motion estimation unit 1202 and the motion compensation unit 1204.

The intra prediction unit 1206 performs intra prediction where a prediction value of a macroblock of a current picture is searched for in the current picture. To determine whether to perform inter prediction or intra prediction on a current macroblock, RD costs are calculated in all the possible encoding modes, a mode having the smallest RD cost is determined as an encoding mode for the current macroblock, and encoding is performed on the current macroblock in the determined encoding mode.

Once prediction data to be referred to by a macroblock of a current frame is found through inter prediction or intra prediction, it is extracted from a macroblock of a current picture. The remaining of the macroblock is transformed by the transformation unit 1208 and is quantized by the quantization unit 1210. The remaining of the macroblock after the extraction of the prediction data is called as a residual. The residual is also encoded to reduce the amount of data in encoding. The quantized residual passes through the rearrangement unit 1212 to be encoded by the entropy encoding unit 1214. The entropy encoding unit 1214 is configured as described with reference to FIGS. 8A through 8G.

To obtain a reference picture to be used for inter prediction, a quantized picture passes through the inverse quantization unit 1216 and the inverse transformation unit 1218 to reconstruct a current picture. The reconstructed current picture is stored in the frame memory 1222 and is used later for inter prediction of a next picture. Once the reconstructed current picture passes through the filter 1220, the original picture having additional encoding errors is obtained.

Figure 13:
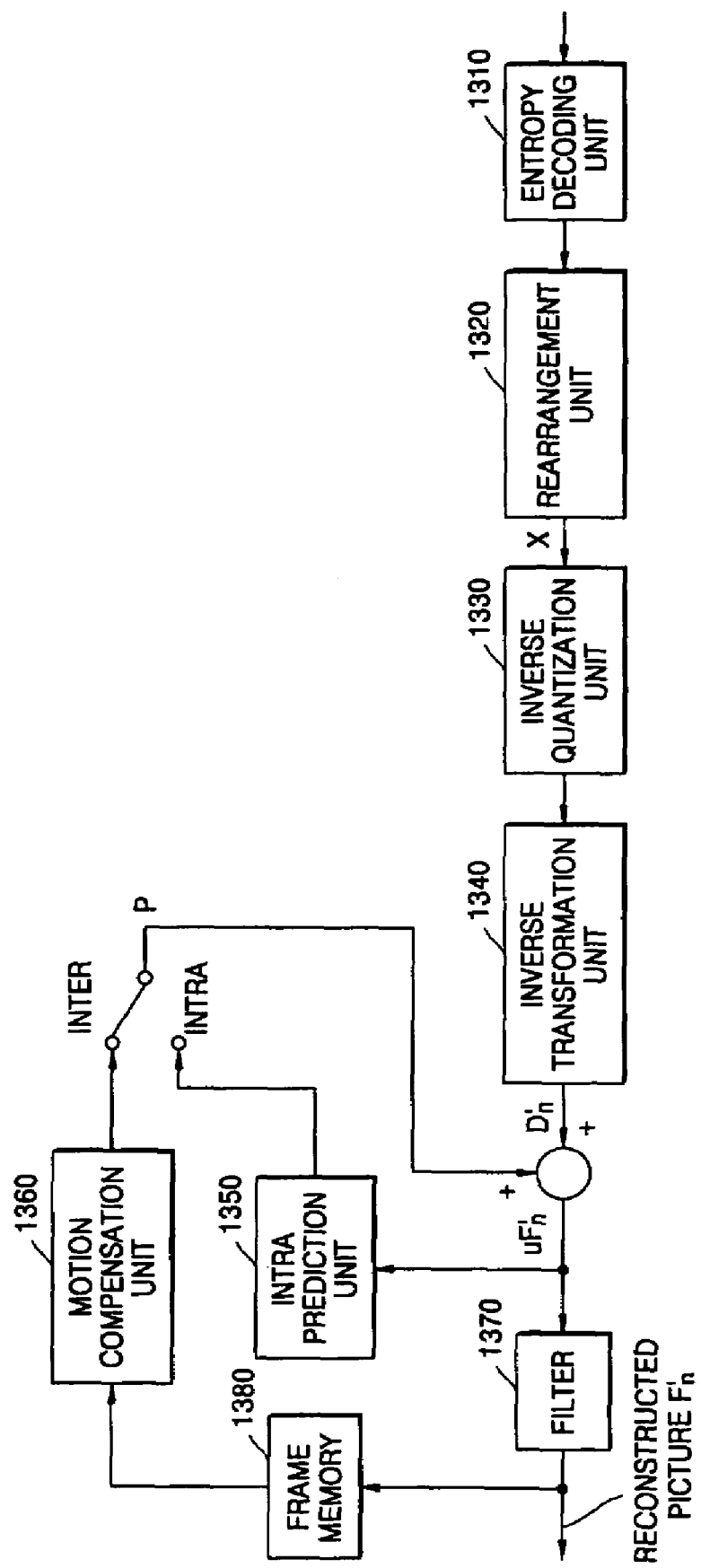
FIG. 13 is a block diagram of a video decoder having an entropy decoder according to an exemplary embodiment of the present invention.

FIG. 13 is a block diagram of a video decoder having an entropy decoder according to an exemplary embodiment of the present invention.

The video decoder includes an entropy decoding unit 1310, a rearrangement unit 1320, an inverse quantization unit 1330, an inverse transformation unit 1340, an intra prediction unit 1350, a motion compensation unit 1360, a filter 1370, and a frame memory 1380.

Once a bitstream encoded by a video encoder is input, the entropy decoding unit 1310 extracts symbol data by performing entropy decoding on the input bitstream. Other components of the video decoder have the same configurations and functions as those described with reference to FIG. 12.

As described above, according to exemplary embodiments of the present invention, the encoding efficiency can be improved by performing entropy encoding using not only syntax elements in the same layer but also syntax elements in lower layers in scalable video encoding.

The methods for entropy encoding and entropy decoding according to exemplary embodiments of the present invention can also be embodied as computer readable code on a computer readable recording medium. Code and code segments forming the computer program can be easily construed by computer programmers skilled in the art. Also, the computer program can be stored in computer readable media and read and executed by a computer, thereby implementing the methods for entropy encoding and entropy decoding. Examples of the computer readable media include magnetic tapes, optical data storage devices, and carrier waves.

While exemplary embodiments of the present invention have been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A scalable entropy encoding method comprising:
   determining a context by referring to syntax elements in a same layer as a block including a syntax element to be encoded and syntax elements in lower layers, or referring to only the syntax elements in the lower layers; and
   performing entropy encoding on the syntax element to be encoded using the determined context.

2. The scalable entropy encoding method of claim 1, wherein the syntax elements referred to are of a same type as the syntax element to be encoded.

3. The scalable entropy encoding method of claim 1, wherein the context indicates a probability value.

4. The scalable entropy encoding method of claim 1, wherein the context indicates predetermined symbol-codeword mapping information.

5. The scalable entropy encoding method of claim 1, wherein the syntax elements referred to include elements of a same type as the syntax element to be encoded and elements of a different type from the syntax element to be encoded.

6. The scalable entropy encoding method of claim 1, wherein the entropy encoding is arithmetic coding using a predetermined arithmetic expression or encoding using symbol-codeword mapping information.

7. The scalable entropy encoding method of claim 1, wherein the entropy encoding is performed using predetermined symbol-codeword mapping information.

8. The scalable entropy encoding method of claim 6, wherein the entropy encoding is one of binary arithmetic coding, arithmetic coding, Huffman coding, and universal variable length coding.

9. The scalable entropy encoding method of claim 1, further comprising transforming the syntax element to be encoded into a binary string.

10. The scalable entropy encoding method of claim 9, wherein the syntax element to be encoded is transformed into a binary string by referring to the syntax elements in the same layer as the block including the syntax element to be encoded, the syntax elements in the lower layers, or both of the syntax elements in the same layer and the syntax elements in the lower layers.

11. The scalable entropy encoding method of claim 10, wherein mapping between the syntax element to be encoded and the binary string is fixed or variably changes according to the determined context.

12. An entropy encoding method comprising:
   transforming a syntax element to be encoded into a binary string by referring to syntax elements in a same layer as a block including the syntax element to be encoded, syntax elements in lower layers, or both of the syntax elements in the same layer and the syntax elements in the lower layers;
   determining a context by referring to the syntax elements in the same layer; and
   performing entropy encoding on the syntax element to be encoded using the determined context.

13. A scalable entropy decoding method comprising:
   receiving entropy-encoded data and determining a context by referring to syntax elements in a same layer as a block including an entropy-encoded syntax element and syntax elements in lower layers, or referring to only the syntax elements in the lower layers; and performing entropy decoding on the entropy-encoded data using the determined context.

14. The scalable entropy decoding method of claim 13, wherein the syntax elements referred to are of a same type as the syntax element to be encoded.

15. The scalable entropy decoding method of claim 13, wherein the context indicates a probability value.

16. The scalable entropy decoding method of claim 13, wherein the context indicates predetermined symbol-codeword mapping information.

17. The scalable entropy decoding method of claim 13, wherein the syntax elements referred to include elements of a same type as the syntax element to be encoded and elements of a different type from the syntax element to be encoded.

18. The scalable entropy decoding method of claim 13, wherein the entropy decoding is arithmetic decoding using a predetermined arithmetic expression or encoding using symbol-codeword mapping information.

19. The scalable entropy decoding method of claim 18, wherein the entropy decoding is one of binary arithmetic decoding, arithmetic decoding, Huffman decoding, and universal variable length decoding.

20. The scalable entropy decoding method of claim 13, further comprising transforming the entropy-decoded binary string into a symbol.

21. The scalable entropy decoding method of claim 20, wherein the entropy-decoded binary string is transformed into a symbol by referring to the syntax elements in the same layer as the block including the entropy-encoded syntax element, the syntax elements in the lower layers, or both of the syntax elements in the same layer and the syntax elements in the lower layers.

22. An entropy decoding method comprising:
receiving entropy-encoded data and determining a context by referring to syntax elements in a same layer as a block including an entropy-encoded syntax element;
performing entropy decoding on the entropy-encoded data using the determined context; and
transforming an entropy-decoded binary string into a symbol by referring to one of the syntax elements in the same layer as the block including the entropy-encoded syntax element, syntax elements in lower layers, or both of the syntax elements in the same layer and the syntax elements in the lower layers.

23. The entropy decoding method of claim 22, wherein mapping between the binary string and the symbol is fixed or variably changes according to the determined context.

24. A scalable entropy encoder comprising:
a context determining unit which determines a context by referring to syntax elements in a same layer as a block including a syntax element to be encoded and syntax elements in lower layers, or referring to only the syntax elements in the lower layers; and
an entropy encoding engine which performs entropy encoding on the syntax element to be encoded using the determined context.

25. The scalable entropy encoder of claim 24, wherein the context determining unit determines a context by referring to syntax elements of a same type as the syntax element to be encoded.

26. The scalable entropy encoder of claim 24, wherein the context indicates a probability value.

27. The scalable entropy encoder of claim 24, wherein the context indicates predetermined symbol-codeword mapping information.

28. The scalable entropy encoder of claim 24, wherein the context determining unit determines a context by referring to syntax elements of a same type as the syntax element to be encoded and syntax elements of a different type from the syntax element to be encoded.

29. The scalable entropy encoder of claim 24, wherein the entropy encoding engine performs arithmetic coding using a predetermined arithmetic expression or encoding using symbol-codeword mapping information.

30. The scalable entropy encoder of claim 29, wherein the entropy encoding engine performs one of binary arithmetic coding, arithmetic coding, Huffman coding, and universal variable length coding.

31. The scalable entropy encoder of claim 24, further comprising a binary string transforming unit which transforms the syntax element to be encoded into a binary string.

32. The scalable entropy encoder of claim 31, wherein the binary string transforming unit transforms the syntax element to be encoded into a binary string by referring to the syntax elements in the same layer as the block including the syntax element to be encoded, the syntax elements in the lower layers, or both of the syntax elements in the same layer and the syntax elements in the lower layers.

33. An entropy encoder comprising:
a binary string transforming unit which transforms a syntax element to be encoded into a binary string by referring to syntax elements in a same layer as a block including the syntax element to be encoded, syntax elements in lower layers, or both of the syntax elements in the same layer and the syntax elements in the lower layers;
a context determining unit which determines a context by referring to the syntax elements in the same layer; and
an entropy encoding engine which performs entropy encoding on the syntax element to be encoded using the determined context.

34. The entropy encoder of claim 33, wherein the binary string transforming unit transforms the syntax element to be encoded into a binary string using mapping between the syntax element to be encoded and the binary string that is fixed or variably changes according to the determined context.

35. A scalable entropy decoder comprising:
a context determining unit which receives entropy-encoded data and determines a context by referring to syntax elements in a same layer as a block including an entropy-encoded syntax element and syntax elements in lower layers, or referring to only the syntax elements in the lower layers; and
an entropy decoding engine which performs entropy decoding on the entropy-encoded data using the determined context.

36. The scalable entropy decoder of claim 35, wherein the context determining unit determines a context by referring to syntax elements of a same type as the syntax element to be encoded.

37. The scalable entropy decoder of claim 35, wherein the context indicates a probability value.

38. The scalable entropy decoder of claim 35, wherein the context indicates one of a plurality of predetermined symbol-codeword mapping information.

39. The scalable entropy decoder of claim 35, wherein the context determining unit determines a context by referring to syntax elements of a same type as the syntax element to be encoded and syntax elements of a different type from the syntax element to be encoded.

40. The scalable entropy decoder of claim 35, wherein the entropy decoding engine performs arithmetic decoding using a predetermined arithmetic expression or encoding using symbol-codeword mapping information.

41. The scalable entropy decoder of claim 40, wherein the entropy encoding engine performs one of binary arithmetic decoding, arithmetic decoding, Huffman decoding, and universal variable length decoding.

42. The scalable entropy decoder of claim 35, further comprising a symbol transforming unit which transforms an entropy-decoded binary string into a symbol.

43. The scalable entropy decoder of claim 42, wherein the symbol transforming unit transforms an entropy-decoded binary string into a symbol by referring to the syntax elements in the same layer as the block including the entropy-encoded syntax element, the syntax elements in the lower layers, or both of the syntax elements in the same layer and the syntax elements in the lower layers.

44. An entropy decoder comprising:

a context determining unit which receives entropy-encoded data and determines a context by referring to syntax elements in a same layer as a block including an entropy-encoded syntax element;

an entropy decoding engine which performs entropy encoding on the entropy-encoded data using the determined context; and a symbol transforming unit which transforms an entropy-decoded binary string into a symbol by referring to the syntax elements in the same layer as the block including the entropy-encoded syntax element, syntax elements in lower layers, or both of the syntax elements in the same layer and the syntax elements in the lower layers.

45. The entropy decoder of claim 44, wherein the symbol transforming unit transforms an entropy-decoded binary string into a symbol using mapping between the entropy-encoded syntax element and the binary string that is fixed or variably changes according to the determined context.

* * * * *